United States Patent
Maeda

(10) Patent No.: US 7,760,222 B2
(45) Date of Patent: Jul. 20, 2010

(54) IMAGE FORMING APPARATUS AND METHOD WITH IMPROVED CAPABILITIES OF CORRECTING IMAGE MAGNIFICATION ERROR

(75) Inventor: Katsuhiko Maeda, Kawasaki (JP)

(73) Assignee: Ricoh Company, Ltd., Tokyo (JP)

( * ) Notice: Subject to any disclaimer, the term of this patent is extended or adjusted under 35 U.S.C. 154(b) by 594 days.

(21) Appl. No.: 11/337,685

(22) Filed: Jan. 24, 2006

(65) Prior Publication Data

US 2006/0187473 A1  Aug. 24, 2006

(30) Foreign Application Priority Data

Jan. 24, 2005  (JP)  ............... 2005-016147

(51) Int. Cl.
*B41J 2/47* (2006.01)
*B41J 2/435* (2006.01)

(52) U.S. Cl. ............... 347/225; 347/234; 347/237; 347/247; 347/248

(58) Field of Classification Search ............... 347/225, 347/234, 237, 247, 248
See application file for complete search history.

(56) References Cited

U.S. PATENT DOCUMENTS 6,493,011 B1  12/2002  Shioya
6,791,596 B2 *  9/2004  Nihei et al. ............... 347/247
2001/0028387 A1 *  10/2001  Maeda ............... 347/232
2004/0160506 A1 *  8/2004  Maeda ............... 347/129

FOREIGN PATENT DOCUMENTS

| JP | 10-213940 | 8/1998 |
|----|-----------|--------|
| JP | 2000-229444 | 8/2000 |
| JP | 2001-171162 | 6/2001 |
| JP | 2001-180043 | 7/2001 |
| JP | 2002-29085 | 1/2002 |
| JP | 2004-181833 | 7/2004 |

* cited by examiner

*Primary Examiner*—Stephen D Meier
*Assistant Examiner*—Sarah Al-Hashimi
(74) *Attorney, Agent, or Firm*—Oblon, Spivak, McClelland, Maier & Neustadt, L.L.P.

(57) ABSTRACT

An image forming apparatus and method that detects a light beam deflected by a polygon mirror at least at two separate locations on the line in the horizontal scanning direction, measures the difference in time of passage between these locations, makes a comparison between the thus determined interval and a reference interval, and generates a proper amount of correction corresponding to the determined interval, such as either correction data adapted to change the frequency of a pixel clock, or further correction data to change the period of the pixel clock by pixels.

21 Claims, 17 Drawing Sheets

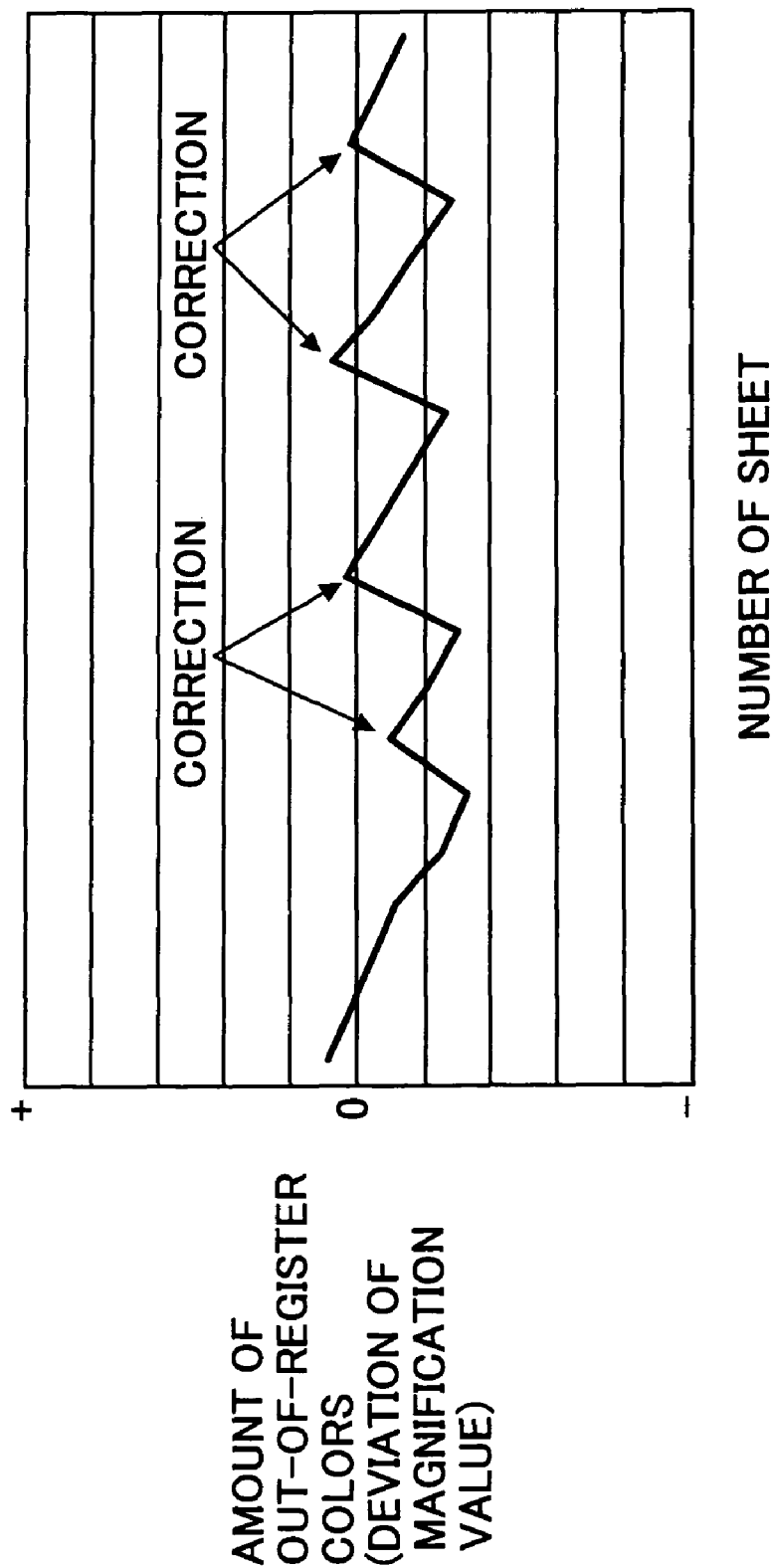

IMAGE FORMING APPARATUS AND METHOD WITH IMPROVED CAPABILITIES OF CORRECTING IMAGE MAGNIFICATION ERROR

This application claims priority to Japanese Patent Application No. 2005-16147, filed with the Japanese Patent Office on Jan. 24, 2005, the entire contents of which are hereby incorporated by reference.

BACKGROUND OF THE INVENTION

1. Field of the Invention

The present invention generally relates to image forming apparatuses and methods, and more specifically to an image forming apparatus and method with improved capabilities of correcting image magnification error without prolonging non-writing periods and unduly affecting print speeds.

2. Discussion of the Background

In increasingly versatile image forming apparatuses, various improvements have been made in the area of image qualities to cope with severe requirements.

In an image forming apparatus such as a copying machine, a copier, a facsimile, and a printer inclusive of their color models, light beam scanning systems are utilized for optical data writing.

The electrophotographic image forming process utilizing such a light beam scanning system is well known, in which the formation of the images is performed through the electrophotographic process with a light beam by modulating according to image data, deflecting with a constant angular velocity in the horizontal (primary) scanning direction by a rotating deflecting unit (polygon mirror), converting while properly adjusting to constant linear velocity by an f-θ lens, and scanning the light beam over the surface of an image bearing member (photoreceptor).

With regard to the light beam scanning systems, however, several drawbacks have previously been encountered such as, for example, undue variation of image magnification between the systems, which is caused by the variation or dispersion of characteristics of the system (e.g., lens). The dispersion may become evident when a plastic lens is employed in the beam scanning system. This arises from relatively large changes in shape or refractive index primarily with the change in its ambient temperature.

This gives rise to undesirable positional shifts of beam scanning on the surface of the photoreceptor, that is, deviations of image magnification (which is hereinafter also referred to as errors) in the horizontal scanning direction. As a result, several difficulties are encountered in achieving high image qualities.

Furthermore, in the case of forming multiple-color images by the image forming apparatus incorporating multiple lenses for transmitting plural laser beams, the dispersion may become more pronounced by accumulating a shear in color printing (out-of-register color) caused by the errors of image magnification from respective lenses, whereby image qualities are deteriorated especially in color, in this case.

Therefore, it would be desirable to properly adjust the image magnification for respective colors to the extent possible.

Several disclosures have previously been made to obviate the difficulties that arise from the above-mentioned changes in system characteristics with the change in its ambient temperature and other factors, which may be achieved by adjusting image magnification in the horizontal scanning direction.

For example, in Japanese Laid-Open Patent Application No. 2001-180043, a method is disclosed in which the accuracy of magnification correction may improve by detecting a light beam deflected by a polygon mirror at least at two separate locations on the line in the horizontal scanning direction, measuring the difference in time of passage between these locations, and suitably changing the frequency of a pixel clock and the speed of rotation of a polygon mirror, whereby corrections of image magnification are made without further subdividing the incremental step of a writing clock.

Another method is described in Japanese Laid-Open Patent Application No. 2000-229444 also for correcting image magnification in the horizontal scanning direction with an improved accuracy.

In this method, when the frequency of a pixel clock is controlled by a minimum incremental step to correct the image magnification, each dividing ratio of two frequency dividers included in a pixel clock generator is properly adjusted during the control of the frequency.

As a result, the correction is carried out with a high accuracy without deteriorating the jitter of a video clock and the image magnification corrections in the horizontal scanning direction can be performed by a relatively inexpensive structure with a high degree of accuracy.

In addition, still another method is disclosed in Japanese Laid-Open Patent Application No. 10-213940, in which test patterns are formed for detecting positional deviation between pages and the amount of the deviation is obtained by a detector. Based on the thus obtained amount, corrections between pages can be made several times to keep the color shear in printing to a minimum without impairing the efficiency in image processing.

FIG. 17 is a timing diagram illustrating the timing of output signals for making magnification corrections between pages (recording sheets) in a previous image forming apparatus configured to form a full-color image by superposing four monochromatic images.

Referring to FIG. 17, a signal XSTART is output by pages for starting a print operation, and XFGATE signals are subsequently generated, based on the signal XSTART, for determining the timing of writing images in respective colors, Y, M, C, and K. The print operations are each initiated at the point of time when the signal XSTART turns low (L).

In the above-mentioned method disclosed in the application No. 2001-180043, the speed of rotation of polygon mirror is adapted to change for making image magnification corrections.

When an image forming apparatus, which is configured to form four-color images with one polygon mirror, makes magnification corrections between pages in the manner illustrated in FIG. 17, it should be noted that the steps of the correction can be initiated only after completing a printing operation.

Also, in the case when multiple polygon mirrors are provided for use in respective colors, the next writing operation has to begin after changing, and subsequently stabilizing the number of rotation for the mirrors. In those cases, therefore, the interval between the pages has to increase to properly perform magnification corrections.

In addition, in the case when both the detection and correction of the magnification error are made within a single page, it takes more time and the interval between the pages increases accordingly, since the data obtained from the detection have to be reflected to, and utilized for the correction.

In the method described in the application No. 2000-229444, image magnification corrections are made by generating pixel clocks with a PLL circuit and changing its dividing ratio.

Since the circuit generally takes time from (a) setting a dividing ratio to (b) reaching a predetermined value of the pixel clock frequency, it is difficult to properly change the frequency within the time period between pages during a continuous printing operation, and the magnification corrections are carried out by increasing the interval between the pages, as illustrated in FIG. 17.

When both the detection and correction of the magnification error are intended within a single page, it takes more time and the interval between the pages increases accordingly.

Since this increase in the interval may unduly affect the printing speed, the interval of the magnification correction has to increase, that is, the frequency of the correction decreases. Therefore, when the corrections are carried out as above, the deviation in image magnification becomes significant as illustrated in FIG. 18, whereby out-of-register colors appear noticeable in resulting images.

Furthermore, although test patterns are formed for detecting positional deviation between pages in the method disclosed in the application No. 10-213940, this gives rise to another drawback, such as an increased amount of toner consumption in every pattern formation.

In addition, since the corrections are made step by step with the pages, it takes time to complete the correction. This prolonged time may not be so problematic as long as any appreciable deviation can be prevented. It is desirable, however, for the former difficulty in toner consumption to be obviated as much as possible, because the toner consumed by pattern printing may be considered as other than necessary by a user.

SUMMARY OF THE INVENTION

Accordingly, it is an object of this invention to provide a novel image forming apparatus and method with improved capabilities of correcting an error of image magnification having most, if not all, of the advantages and features of similarly employed apparatuses and methods, while reducing or eliminating many of the aforementioned disadvantages.

It is another object to provide a novel image forming apparatus capable of correcting an error of image magnification without prolonging non-writing periods and unduly affecting print speeds.

The following description is a synopsis of only selected features and attributes of the present disclosure. A more complete description thereof is found below in the Description of the Preferred Embodiments section.

The above and other objects of the invention are achieved by providing an image forming apparatus, comprising:
an image forming unit;
a detection unit configured to detect an error of image magnification in the horizontal scanning direction during at least one non-writing period, which is defined by the period of time from a finish of a current image writing to a start of the next image writing in the horizontal scanning direction; and
a correcting unit configured to:
instruct the detection unit to detect the error during the first non-writing period, and
correct the error during the second non-writing period based on the result of the error obtained by the detection unit.

The image forming unit included in the image forming apparatus comprises:

a light beam scanning system, including:
first and second light beam sensing units configured to detect a light beam deflected by a beam deflection unit in the horizontal scanning direction, and
a time measurement unit configured to measure a time difference in light beam detection between the first and second light beam sensing units.

The correcting unit is configured to compute the error of image magnification based on the result of the time difference measured by the time measurement unit, and correct the error at intervals of a predetermined period after finishing a printing operation. The predetermined period may be set externally by an external input unit.

In addition, the light beam scanning system further comprises:
a light source configured to be lighting controlled according to image data, and
at least one of:
a frequency control unit configured to variably control the frequency of a pixel clock for use in lighting control of the light source, and
a cycle control unit configured to variably control the cycle of the pixel clock, so as to correct the error by variably controlling at least one of the frequency and cycle.

The cycle of the pixel clock is variably controlled by pixels, and the variable control by pixels is implemented at more than one location in the horizontal scanning direction.

It is another feature of the invention to provide a novel image forming apparatus, comprising an image forming unit, a detection unit configured to detect an error of image magnification in a horizontal scanning direction, which is detected between at least two pages during a continuous image printing operation on a plurality of pages, and a correcting unit configured to instruct the detection unit to detect the error between first and second pages of a first group, and correct the error on third and fourth pages of a second group, which is different from the first group, based on the result regarding the error detected by the detection unit.

With regard to the capabilities of the apparatus and units included therein, the image forming apparatus is provided with those similar to the above-mentioned image forming apparatus.

It is yet another feature of the invention to provide a novel image forming apparatus configured to form a color image by superposing at least first and second monochromatic images in first and second colors, respectively.

The image forming apparatus includes:
at least a first and second image forming units configured to form at least first and second monochromatic images, respectively;
a detection unit configured to detect an error of image magnification in the horizontal scanning direction for the at least first and second colors between two pages during a continuous image printing operation on a plurality of pages; and
a correcting unit configured to:
instruct the detection unit to detect the error between first and second pages of a first group, and
correct the error on third and fourth pages of a second group, which is different from the first group, based on the result of the error detected by the detection unit.

Each of the at least first and second image forming units comprises a light beam scanning system, including first and second light beam sensing units configured to detect a light beam deflected by a beam deflection unit in the horizontal scanning direction, and a time measurement unit configured to measure a time difference in light beam detection between the first and second light beam sensing units.

The correcting unit is configured to compute the error based on the result of the time difference measured by the time measurement unit.

The correcting unit is configured to compute the error of image magnification based on the result of the time difference measured by the time measurement unit, and correct the error at intervals of a predetermined period after finishing a printing operation. The predetermined period may be set externally by an external input unit.

Still in addition, several novel methods are also disclosed for correcting an error of image magnification for the above-mentioned image forming apparatuses.

These and other features and advantages of the invention will be more clearly seen from the following detailed description of the invention which is provided in connection with the accompanying drawings.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 18 is a graphical plot illustrating the change in the deviation of magnification with the increase of printed pages obtained according to a previous method.

DESCRIPTION OF THE PREFERRED EMBODIMENTS

Figure 1:
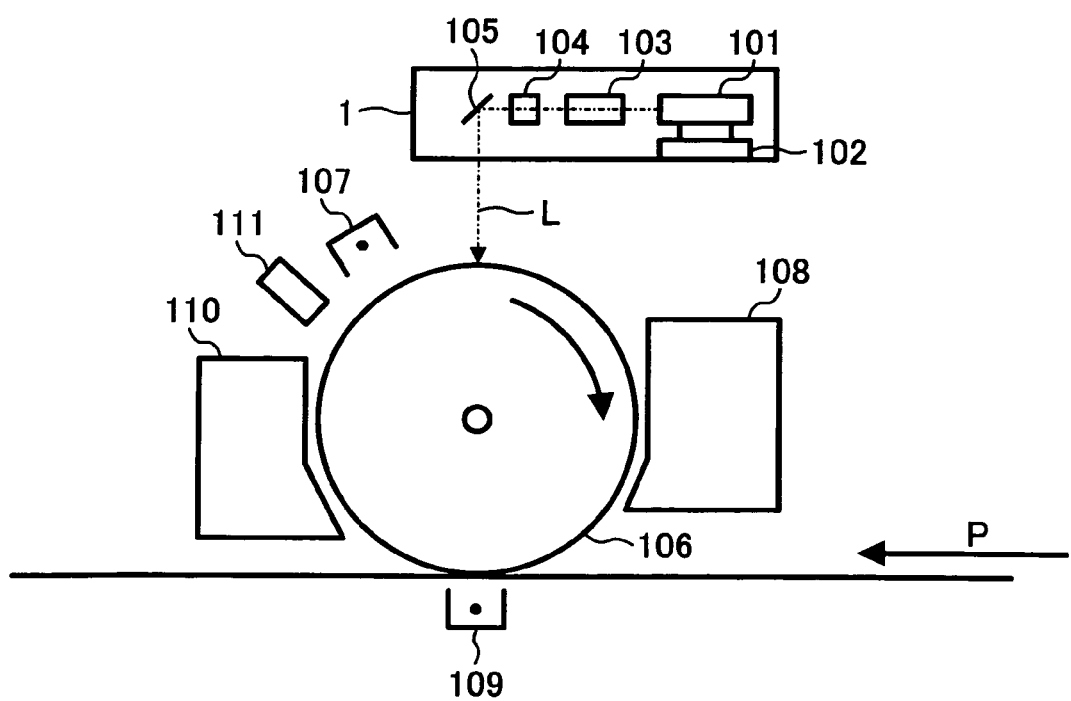
FIG. 1 is a drawing diagrammatically illustrating major components included in an image forming apparatus according to a first embodiment of the invention.

In the detailed description which follows, specific embodiments of an image forming apparatus and method for correcting an error of image magnification are described.

It is understood, however, that the present disclosure is not limited to these embodiments. For example, it is appreciated that the image forming apparatus and method described may also be adaptable to any form of imaging system. Other embodiments will be apparent to those skilled in the art upon reading the following description.

In addition, in the description that follows specific terminology is used in many instances for the sake of clarity. However, the disclosure of this specification is not intended to be limited to the specific terminology so selected and it is to be understood that each specific element includes all technical equivalents that operate in a similar manner.

According to one embodiment of the invention, a first image forming apparatus includes at least an image forming unit, a detection unit, and a correcting unit.

The detection unit is configured to detect an error of image magnification in the horizontal scanning direction during at least one non-writing period, which is defined by the period of time from a finish of a current image writing to a start of the next image writing in the horizontal scanning direction.

The correcting unit is configured to instruct the detection unit to detect the error during the first non-writing period, and correct the error during the second non-writing period, which is different from the first non-writing period, based on the result of the error obtained by the detection unit.

The image forming unit included in the image forming apparatus comprises a light beam scanning system, including first and second light beam sensing units configured to detect a light beam deflected by a beam deflection unit in the horizontal scanning direction, and a time measurement unit configured to measure a time difference in light beam detection between the first and second light beam sensing units.

The correcting unit is configured to compute the error of image magnification based on the result of the time difference measured by the time measurement unit, and correct the error at intervals of a predetermined period after finishing a printing operation. The predetermined period may be set externally by an external input unit.

In addition, the light beam scanning system further comprises a light source configured to be lighting controlled according to image data, and at least one of a frequency control unit configured to variably control the frequency of a pixel clock for use in lighting control of the light source, or a cycle control unit configured to variably control the cycle of the pixel clock, so as to correct the error by variably controlling at least one of the frequency and cycle.

The cycle of the pixel clock is variably controlled by pixels, and the variable control by pixels is implemented at more than one location in the horizontal scanning direction.

The image forming unit included in the image forming apparatus is configured to perform an image formation by forming a latent image on an image bearing member by irradiating a light beam according to image data, developing the latent image into a visible image by a developer unit, and transferring the visible image to a recording medium. Alternatively, the visible image may be transferred first to a transfer unit and then to a recording medium.

According to another embodiment of the invention, a second image forming apparatus comprises an image forming unit, and a detection unit configured to detect an error of image magnification in a horizontal scanning direction, which is detected between at least two pages during a continuous image printing operation on a plurality of pages.

In addition, in the second image forming apparatus a correcting unit included therein is configured to instruct the detection unit to detect the error between first and second pages of a first group, and correct the error on third and fourth pages of a second group, which is different from the first group, based on the result regarding the error detected by the detection unit.

The image forming unit included in the image forming apparatus comprises a light beam scanning system, including first and second light beam sensing units configured to detect a light beam deflected by a beam deflection unit in the horizontal scanning direction, and a time measurement unit configured to measure a time difference in light beam detection between the first and second light beam sensing units.

The correcting unit is configured to compute the error of image magnification based on the result of the time difference measured by the time measurement unit, and correct the error at intervals of a predetermined period after finishing a printing operation. The predetermined period may be set externally by an external input unit.

In addition, the light beam scanning system further comprises a light source configured to be lighting controlled according to image data, and at least one of a frequency control unit configured to variably control the frequency of a pixel clock for use in lighting control of the light source, and a cycle control unit configured to variably control the cycle of the pixel clock, so as to correct the error by variably controlling at least one of the frequency and cycle.

The cycle of the pixel clock is variably controlled by pixels, and the variable control by pixels is implemented at more than one location in the horizontal scanning direction.

The image forming unit included in the image forming apparatus is configured to perform an image formation by forming a latent image on an image bearing member by irradiating a light beam according to image data, developing the latent image into a visible image by a developer unit, and transferring the visible image to a recording medium. Alternatively, the visible image may be transferred first to a transfer unit and then to a recording medium.

According to still another embodiment of the invention, a third image forming apparatus is provided, configured to form a color image by superposing at least first and second monochromatic images in first and second colors, respectively.

The third image forming apparatus includes at least first and second image forming units configured to form at least first and second monochromatic images, respectively, and a detection unit configured to detect an error of image magnification in the horizontal scanning direction for at least first and second colors between two pages during a continuous image printing operation on a plurality of pages.

In addition, in the third image forming apparatus a correcting unit included therein is configured to instruct the detection unit to detect the error between first and second pages of a first group, and correct the error on third and fourth pages of a second group, which is different from the first group, based on the result of the error detected by the detection unit.

In the third image forming apparatus, if the detection of the error is completed for all of the at least first and second colors between the first and second pages, the correcting unit is configured to correct the error successively on the third and fourth pages, while if the detection is not completed properly for any one of at least first and second colors, the correcting unit is configured not to correct the error for all of at least first and second colors.

Each of the at least first and second image forming units comprises a light beam scanning system, including first and second light beam sensing units configured to detect a light beam deflected by a beam deflection unit in the horizontal scanning direction, and a time measurement unit configured to measure a time difference in light beam detection between the first and second light beam sensing units.

The correcting unit is configured to compute the error based on the result of the time difference measured by the time measurement unit and correct the error at intervals of a predetermined period after finishing a printing operation. The predetermined period may be set externally by an external input unit.

The light beam scanning system further comprises a light source configured to be lighting controlled according to image data, another beam deflection unit configured to deflect first and second light beams such that the scanning direction of at least one of the first and second light beams is opposite to at least one light beam deflected by the beam deflection unit, and at least one of a frequency control unit configured to variably control the frequency of a pixel clock for use in lighting control of the light source, or a cycle control unit configured to variably control the cycle of the pixel clock, so as to correct the error by variably controlling at least one of the frequency and cycle.

In addition, the cycle of the pixel clock is variably controlled by pixels, and the variable control by pixels is implemented at more than one location in the horizontal scanning direction.

According to another embodiment of the invention, a method for correcting an error of image magnification for the first image forming apparatus is provided, comprising detecting an error of image magnification in the horizontal scanning direction during a first non-writing period, which is defined by the period of time from a finish of image writing to a start of next image writing in the horizontal scanning direction, and correcting the error during a second non-writing period based on the result of the error obtained in the detecting, in which the second non-writing period is different from the first period.

The correcting the error includes variably controlling at least one of the frequency or the cycle of the pixel clock for use in lighting control of a light source.

According to another embodiment of the invention, a method for correcting an error of image magnification for the second image forming apparatus is provided, comprising detecting an error of image magnification in the horizontal scanning direction between first and second pages of a first group during a continuous image printing operation on a plurality of pages, and correcting the error on third and fourth pages of a second group based on the result of the error obtained in the detecting, in which the second group is different from the first group.

The correcting the error includes variably controlling at least one of the frequency or the cycle of the pixel clock for use in lighting control of a light source.

According to another embodiment of the invention, a method is provided for correcting an error of image magnification for the third image forming apparatus configured to form a color image by superposing at least first and second monochromatic images in first and second colors, comprising detecting an error of image magnification in the horizontal scanning direction between first and second pages of a first group for the at least first and second colors during a continuous image printing operation on a plurality of pages, and correcting the error on third and fourth pages of a second group based on the result of the error detected in the step of detecting, in which the second group is different from the first group.

In the method, if the detection of the error is completed for all the at least first and second colors between the first and second pages, the correcting includes correcting the error successively on the third and fourth pages. By contrast, if the detection of the error is not completed properly for any one of the at least first and second colors, the correcting includes not correcting the error for all the at least first and second colors.

In addition, the correcting the error includes variably controlling at least one of the frequency or the cycle of the pixel clock for use in lighting control of a light source.

Having described the present disclosure in general, several exemplary embodiments of the image forming apparatus will be described herein below according to the present invention.

For a general understanding of the features of the present invention, reference is made to the drawings. In the drawings, like reference numerals have been used throughout to identify identical or corresponding elements.

FIG. 1 is a drawing diagrammatically illustrating major components included in an image forming apparatus according to a first embodiment of the invention.

Referring to FIG. 1, a light beam scanning system (optical unit) 1 comprises a laser diode (which is hereinafter abbreviated as LD) configured to turn on according to image data to be image formed, a collimator lens (not shown) configured to collimate laser beams (or light beams) L emanated from the LD, a cylindrical lens (not shown) configured to form a line focus image of the laser beams parallel to the vertical scanning direction, a polygon mirror 101 configured to deflect the light beams incident from the cylinder lens, a polygon motor 102 configured to rotatory drive the polygon mirror 101 at a high speed, an f-θ lens 103 configured to convert the beam scanning from constant angular velocity to constant linear velocity mode, BTL 104, and a mirror 105.

BTL (Barrel Toroidal Lens) 104 is configured to focus the light beams in the vertical scanning direction. This focusing operation also includes centering control, such as face angle error correction and other similar corrections, of the light beams.

By the above-mentioned construction of the light beam scanning system, the light beams L emanated from the LD are collimated by the collimator lens (not shown) to form parallel beams, pass through the cylindrical lens, are deflected by the polygon mirror 101 rotated by the polygon motor 102, are transmitted further through the f-θ lens 103 and BTL 104, are reflected by the mirror 105, and are scanned over the surface of a photoreceptor 106.

Provided on the periphery of the photoreceptor 106 are a charging unit 107, a developer unit 108, a transfer unit 109, a cleaning unit 110, and a static eliminator (dis-electrification unit) 111, which operate as an image forming system.

These units and elements cooperatively form an image on a recording (paper) sheet P by performing conventional electro-photographic processes, such as charging, exposing, developing, and transfer. The image formed on the recording sheet P is subsequently fixed by a fixing unit (not shown).

Figure 2:
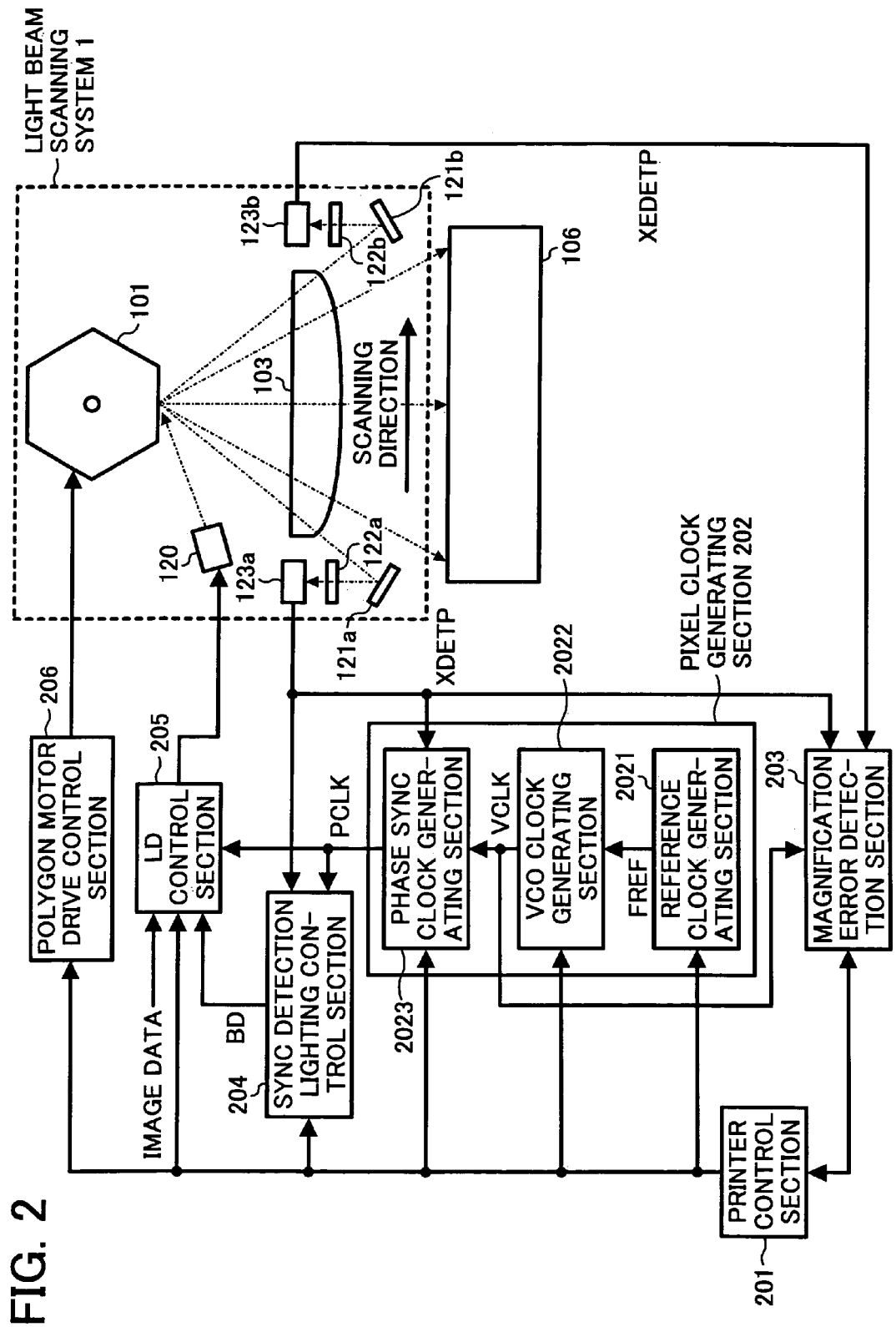
FIG. 2 is a drawing diagrammatically illustrating the light beam scanning system and image forming control sections included in the image forming apparatus of FIG. 1.

FIG. 2 is a drawing diagrammatically illustrating the light beam scanning system and image forming control sections included in the image forming apparatus. This is a plan view of the laser beam scanning system 1 of FIG. 1 and the control sections configured to control the plurality of above noted peripheral units.

There included in the control sections are a printer control section 201, a pixel clock generating section 202, a magnification error detection section 203, a lighting control section 204 for synchronized detection (or sync detection lighting control section 204), an LD control section 205, and a polygon motor drive control section 206.

In addition, the pixel clock generating section 202 includes a reference clock generating section 2021, a voltage controlled oscillator (VCO) clock generating section 2022, and a phase synchronization (sync) clock generating section 2023.

Furthermore, first and second sync detection sensors, 123a and 123b, are provided at respective ends of a light beam scanning region in the horizontal scanning direction of the light beam scanning system 1.

After emanated from LD unit 120, reflected by the face of the polygon mirror 101, and transmitted through the f-θ lens 103, the light beams L are reflected by first and second mirrors, 121a and 121b, focused by first and second lenses, 122a and 122b, and become incident onto the first and second sync detection sensors, 123a and 123b, respectively.

Upon passing the first and second sync detection sensors, 123a and 123b, of the light beams L during the beam scanning, a sync detection signal at a starting side (start side sync detection signal) XDETP and a sync detection signal at an ending side (end side sync detection signal) XEDETP are output from the first and second sync detection sensors, 123a and 123b, respectively, to be output subsequently to the magnification error detection section 203.

The magnification error detection section 203 is then adapted to (a) determine a time interval (interval) between the leading edge of the start side sync detection signal XDETP and the falling edge of the end side sync detection signal XEDETP, (b) make a comparison between the thus determined interval and a reference interval, (c) generate a proper amount of correction corresponding to the determined interval, specifically, such as either correction data 1 adapted to change the frequency of the pixel clock, or correction data 2 adapted to change the period of the pixel clock by pixels, (d) send the correction amount to the pixel clock generating section 202, and (e) correct the image magnification by the correction amount.

The correction data 1 is represented by at least one of a frequency setting value for the reference clock FREF and a dividing ratio (N) setting value for the PLL circuit, while correction data 2 is specified by the value of phase shift (i.e., the value of variable period) and its sense (i.e., either advance or delay).

The start side sync detection signal XDETP from the first sync detection sensor 123a is also sent to the pixel clock generating section 202 and sync detection lighting control section 204.

The phase sync clock generating section 2023 included in the pixel clock generating section 202 is adapted to generate a pixel clock PCLK synchronous with the start side sync detection signal XDETP, which is sent to both LD control section 205 and lighting control section 204.

Figure 3:
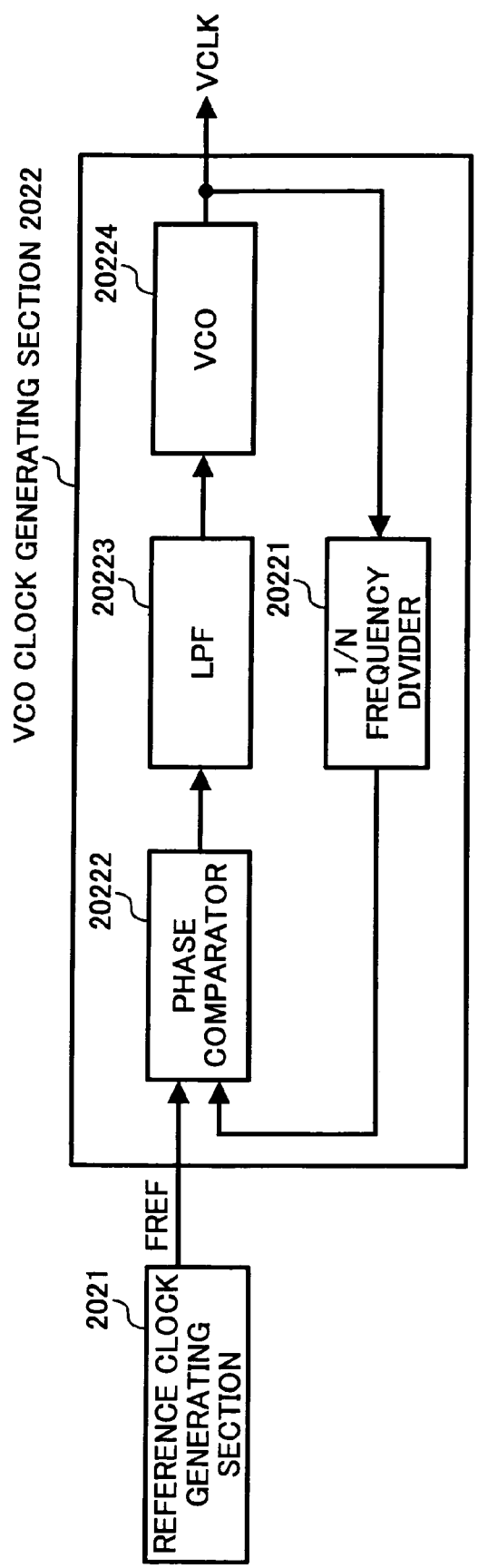
FIG. 3 is a block diagram illustrating the configuration of the VCO clock generating section as a phase locked loop circuit included in the pixel clock generating section.

FIG. 3 is a block diagram illustrating the configuration of the VCO clock generating section 2022 as a phase locked loop (PLL) circuit.

The VCO clock generating section 2022 is adapted to input both the reference clock FREF from the reference clock generating section 2021 and the signal obtained by dividing a clock VCLK with 1/N frequency divider 20221 to a phase comparator 20222.

The phase comparator 20222 is in turn adapted to make a comparison between the phases of a leading edge for both of the above-mentioned signals, whereby an error component is extracted as a constant current output.

Subsequently, the constant current output is subjected to the removal of undesirable high frequency components and noises performed by the low-pass filter (LPF) 20223. The resulting signal is sent to VCO 20224, which is adapted to output a signal having the oscillation frequency corresponding to the output from LPF 20223.

As a result, the change in the VCLK frequency is achieved by the instruction issued by the printer control section 201 to change the FREF frequency and the dividing ratio N.

The phase sync clock generating section 2023 is adapted to generate (a) a first pixel clock PCLK from the clock VCLK which is set to have the frequency of eight-times that of the pixel clock, and further (b) a second pixel clock PCLK to be synchronized with the start side sync detection signal XDETP.

In addition, the phase of leading edge of PCLK is made either retarded or advanced by one-half period of VCLK depending on correction data supplied by the printer control section 201.

Figure 4:
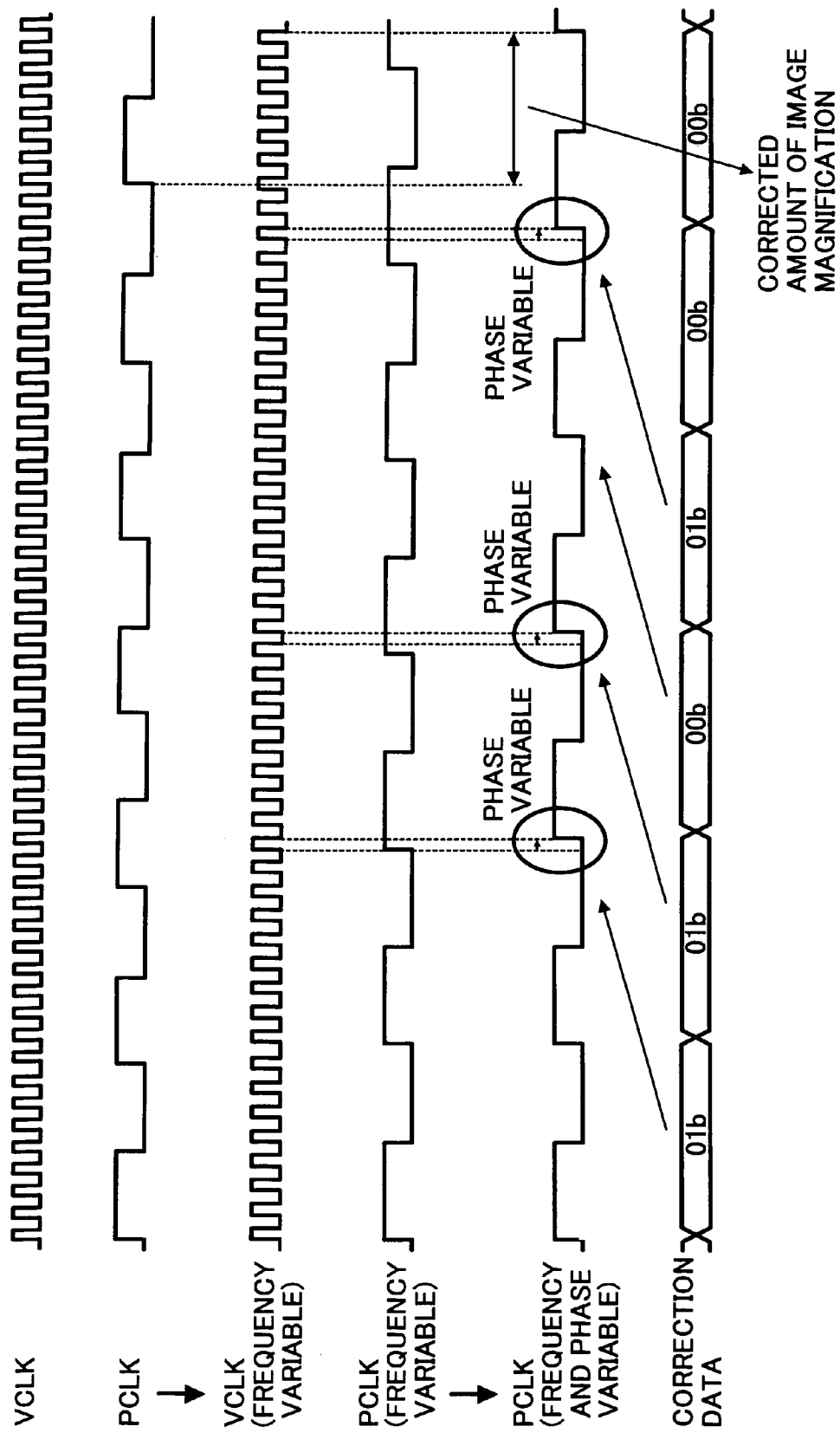
FIG. 4 includes a timing diagram illustrating output timing of the pixel clock PCLK, related signal VCLK, and correction data.

FIG. 4 is a timing diagram illustrating output timing of the pixel clock PCLK, the related clock VCLK, and correction data. The correction data 2 from the printer control section 201 are herein assigned such that no correction is made for the data "00b", and the phase is delayed, and advanced by 1/16 PCLK for "01b" and "10b", respectively.

The correction data are sent synchronous with the pixel clock PCLK and affect at the next leading edge of pixel clock PCLK. As illustrated in FIG. 4, for the correction data "00b" no correction is implemented in the period of PCLK, thus remaining to be eight-times that of VCLK. For the correction "01b", by contrast, the phase of PCLK is delayed by 1/16 PCLK at the next leading edge and this effect continues in the succeeding periods.

In the case illustrated in FIG. 4, the phase shift is carried out three times and the change in the frequency as well. As a result, the correction of image magnification is achieved by 3/16 PCLK together with the variation of the frequency.

It is added in this context that the correction of image magnification may be carried out with at least one of correction data, 1 and 2. That is, the image magnification is corrected with either the correction data 1, or 2, individually, or alternatively with the data 1 and 2 in combination.

The sync detection lighting control section 204 is adapted first to force the LD turned on by activating a forcible LD lighting signal BD to detect a start side sync detection signal XDETP.

After detecting the XDETP signal, the control section 204 operates to turn the LD device on, by both the start side sync detection signal XDETP and the pixel clock PCLK, at such an appropriate timing that the start side sync detection signal XDETP can securely be detected and that no flare light is generated. In addition, after the detection of the XDETP signal, the control section 204 generates a further forcible LD lighting signal BD to turn LD off and send it to the LD control section 205.

With regard to the end side sync detection signal XEDETP, the detection thereof is carried out by turning the LD device on sufficiently before the incidence onto the second sync detection sensor 123$b$.

The LD control section 205 is configured to control the lighting of the LD source corresponding to the forcible LD lighting signal BD in use for sync detection and the pixel clock PCLK in synchronous with image data. This enables, as mentioned earlier, for the laser beams to be emanated from the LD 120, reflected while deflecting by the polygon mirror 101, transmitted through the f-θ lens 103, and scanned over the surface of a photoreceptor 106.

The polygon motor drive control section 206 is configured to control the rotation of the polygon motor 102 according to the predetermined number of rotations.

Figure 5:
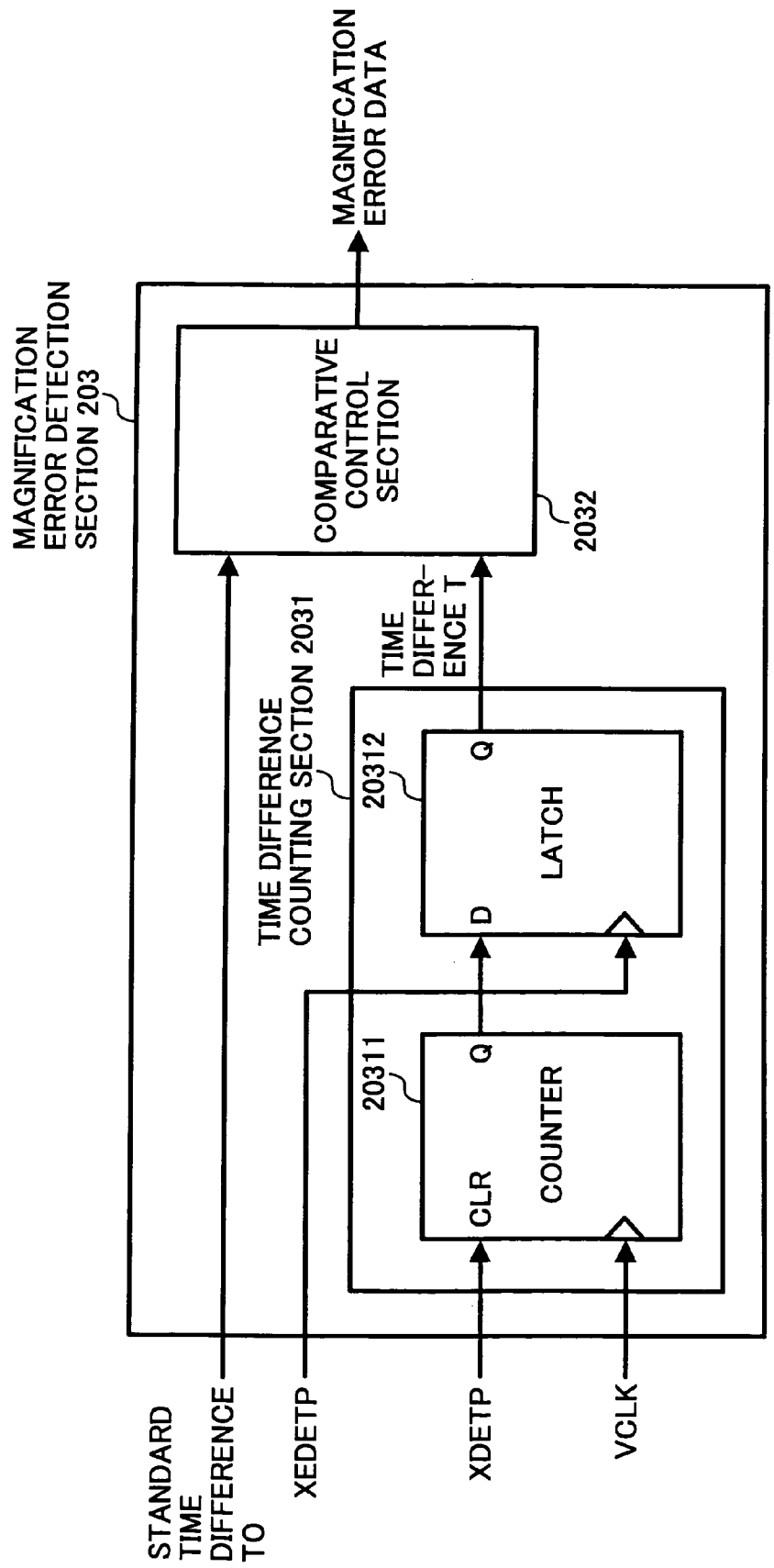
FIG. 5 is a block diagram illustrating in detail the construction of the magnification error detection section of FIG. 2.

FIG. 5 is a block diagram illustrating in detail the construction of the magnification error detection section 203 of FIG. 2.

Referring to FIG. 5, the magnification error detection section 203 includes a time difference counting section 2031 and a comparative control section 2032. The time difference counting section 2031 in turn includes a counter 20311 and a latch 20311.

When a two-point measurement is initiated between the start side sync detection sensors 123$a$ and the end side sync detection sensor 123$b$, the counter 20311 is first cleared by a start side sync detection signal XDETP and counts up with each clock VCLK. The latch unit 20311 is adapted to latch the thus counted number at the leading edge of an end side sync detection signal XEDETP.

Subsequently, the latched number (i.e., time difference T) is forwarded to the comparative control section 2032, and compared with a predetermined standard count (time difference T0). As a result, a piece of difference data (magnification error data) is obtained and sent to the printer control section 201.

Based on the magnification error data, the printer control section 201 then computes correction data, 1 and 2, and sends the computed data to the pixel clock generating section 202.

The pixel clock generating section 202 is configured to make a correction of image magnification by properly changing the frequency and phase of the pixel clock PCLK as illustrated in the timing diagram of FIG. 4.

Incidentally, the standard time difference T0 is one obtained through the measurement made in advance when an image is formed satisfactorily with proper image magnification.

Figure 6:
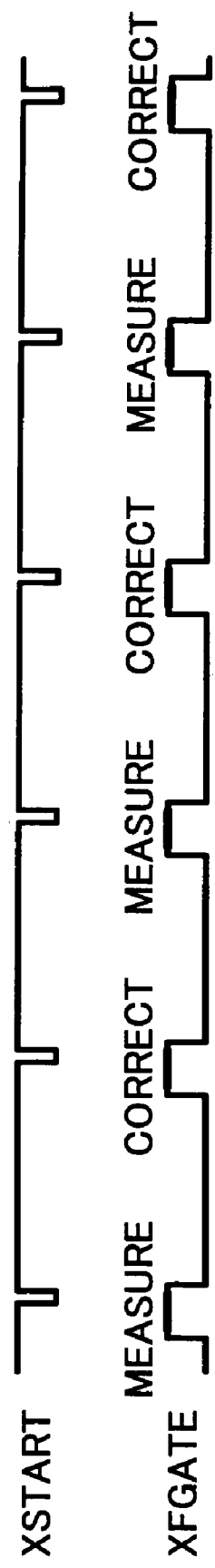
FIG. 6 is a timing diagram illustrating the timing of making magnification corrections according to the first embodiment of the invention.

FIG. 6 is a timing diagram illustrating the timing of making magnification corrections.

Referring to FIG. 6, a signal XSTART is output by pages for starting a print operation and an XFGATE signal is generated, based on the signal XSTART, for determining the timing of writing images and the width of the image in the vertical scanning direction, in which the print operation starts at the point where the signal XSTART turns low (L).

The magnification corrections and the aforementioned two-point measurement are programmed to be carried out alternately during a predetermined period such as, for example, an in-between period of the pages (i.e., "H" period of the signal XSTART). In the present embodiment, the magnification correction and two-point measurement are each carried out alternately page by page one in an H period and the other in the next (FIG. 6). They may alternatively be carried out every several pages.

Figure 7:
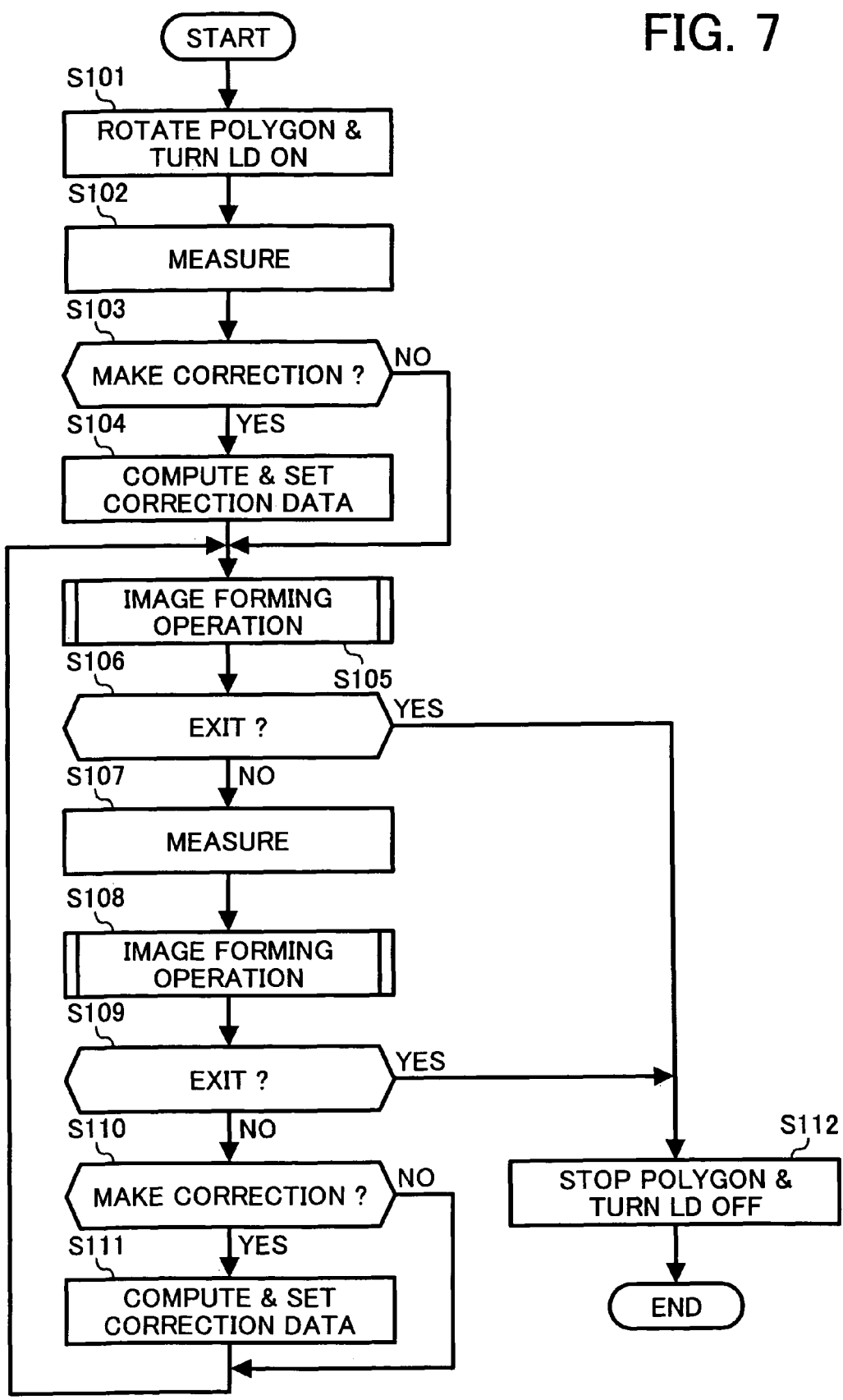
FIG. 7 is a flowchart illustrating magnification correction process steps according to the first embodiment of the invention.

FIG. 7 is a flowchart illustrating magnification correction process steps according to the first embodiment of the invention.

The process for the magnification correction begins in step 5101 in which, prior to the image forming operation, the polygon motor 102 is driven to rotate and LD unit 120 is turned on. Thereafter, a two-point measurement is initiated (step S102). During step S102 the setting of the pixel clock is performed based on correction values presently stored in the printer control section 201.

Subsequently, the observed time difference is compared with the predetermined standard time difference, and an inquiry is made regarding whether any magnification correction is necessary (step S103). The decision on this inquiry is made based on correction resolution (correction precision) in the magnification. If an error of at least one half of the correction resolution is detected, it is determined that a proper correction is necessary and the process proceeds to step S104.

Correction data, 1 and 2, in this case, are then computed to be set subsequently into the pixel clock generating section (step S104) and an image forming (image writing) operation is initiated (step S105).

By contrast, if no error is detected (indicating that no correction is necessary), the process proceeds to step 5105 without changing any setting of the correction data into the pixel clock generating section and an image forming operation is initiated (step S105).

If any further page is not detected, the LD unit is turned off, the polygon motor is brought to a stop, and the process ends (steps S106 and S112).

When the decision on whether a further page(s) is present is not feasible, a two-point measurement may be initiated as a temporary measure. In this case, however, the LD unit may turn off and the polygon motor may stop even during the measurement, and the measurement is invalidated, as a result.

In the case when a further page(s) is found at present, by contrast, another two-point measurement is initiated (step S107). The result obtained the measurement is stored and a still further two-point measurement is initiated.

After an image forming operation in step S108, if no further page is present, the LD unit is turned off, the polygon motor is brought to a stop, and the process ends (steps 5109 and S112).

In the case when a further page(s) is found, by contrast, it is determined whether any magnification correction is necessary based on the result presently stored (step S110).

If it is decided that a proper correction is necessary, the correction data 2, in the present case, are computed to be set into the pixel clock generating section (step S111) and another image forming operation is initiated (step S105). In the case when it is decided that no correction is necessary, still another image forming operation is initiated without changing the setting of the correction data (steps S110 and S105).

Through the period of image formation, the steps of two-point measurement and correction utilizing the correction data 2 are repeated for necessary pages.

Although the correction process in the present embodiment has been illustrated with regard to the correction data 2 herein above, this is due to the fact that phase shift processes can be carried out with a higher speed than a PLL circuit. Therefore, the process may alternatively be carried out by using suitable data other than the correction data 2 as long as the correction between plural pages is feasible by the PLL circuit.

In addition, although both the computation and setting of the correction data have been described to be carried out within one single page, the computation of the data may alternatively be carried out simultaneously with the two-point measurement.

It may be added, in the case when the two-point measurement has not been completed for any faulty reason, the correction naturally cannot be carried out, and that another two-point measurement may be attempted again during the process on the next page.

Figure 8:
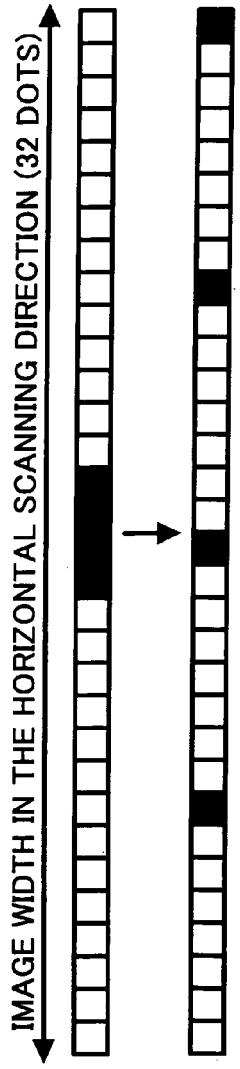
FIG. 8 is a drawing to illustrate several pixels for which the phase is shifted for implementing the magnification correction.

FIG. 8 is a drawing to illustrate several pixels for which the phase is shifted (or the period is changed) for implementing the correction. An assumption is made herein that there are 32 dots in the full image width in the horizontal scanning direction and that the phase is shift by the amount of $4/16$ PCLK.

When this $4/16$ PCLK phase shift is implemented supposedly on four consecutive pixels as illustrated in FIG. 8, the image corresponding to the thus shifted portion including the four pixels may be unduly stretched (or shrank).

Therefore, a mechanism for obviating this difficulty may be provided by dispersing the locations, where the phase is shifted, uniformly over the image width. This may be achieved, for example, by inserting a phase-shifted pixel once every 8 (eight) dots, in that the eight-dots period is obtained as, period of phase-shifted pixel=(width of image)/(number of phase-shifted pixel)=32/4=8.

The expression for calculating the period is not necessarily limited to that mentioned above, but another relation may alternatively be used as long as it is capable of suitably dispersing the undue effects.

Figure 9:
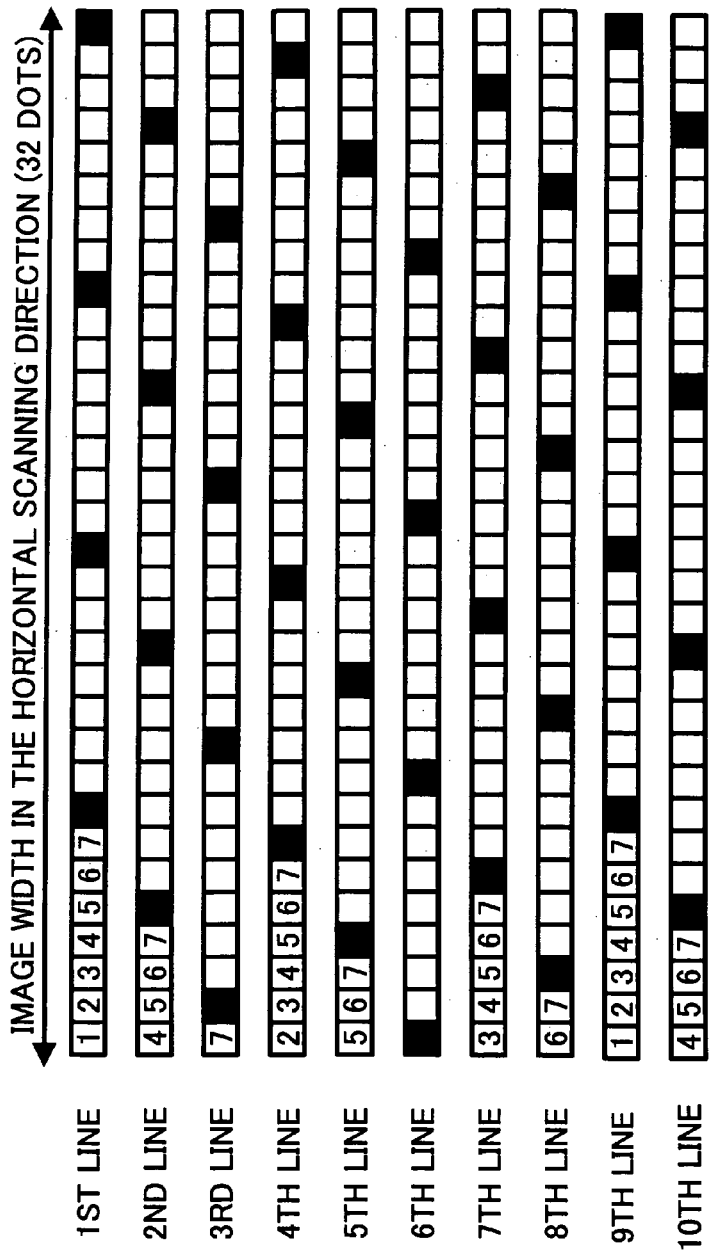
FIG. 9 is a drawing illustrating the location of pixels to prevent undue effects on the image qualities in the vertical scanning direction as well by advancing the starting number of the counter from one line to the next.

In addition to the above noted mechanism in the horizontal scanning direction, the undue effects on the image qualities may further be prevented by (a) dispersing the phase-shifted pixels to be evenly distributed in the horizontal scanning direction, and (b) furthermore, placing them not to be at the same location in the vertical scanning direction, which is illustrated in FIG. 9.

Referring to FIG. 9, another assumption of the pixels is made in the horizontal scanning direction in a manner similar to FIG. 8, in that there are 32 dots in the full image width and four phase-shifted pixels are inserted in a period of eight dots.

The location of the pixel, for which its phase is shifted, is determined by a counter operated by the pixel clock PCLK. Namely, on the first line, the counter counts up starting at 1, the phase-shift is made at the counter readings 8, 16, 24, and 32. From the second line forward, the amount of location change is obtained by the expression, (period of phase-shifted pixel)×$3/7$=8×$3/7$≈3.

The location of placing the pixels, therefore, changes by 3 dots from one line to the next. In a case when this amount exceeds the period of the pixel phase-shift, the surplus portion is additionally applied to the first line.

Accordingly, in contrast to the first line described above on which the counter counts up starting at 1, the starting number of the counter advances (a) by 3 dots resulting in 4 (=1+3) on the second line, (b) further by 3 dots resulting in 7 (=4+3) on the third line, and (b) further by 3 dots resulting in 10 (=7+3) on the fourth line.

Since the starting number (10) in the latter case exceeds the period the phase-shifted pixel (8), the surplus (2=10−8) is now taken as the starting number for the fourth line, as described above (FIG. 9).

The counter counts up in a similar manner on the succeeding lines, which is summarized in FIG. 9.

It is noted that the expression for obtaining the starting number of the counter is not necessarily limited to that described above, but another relation may alternatively be used as long as it is capable of changing the pixel location at random over the lines and suitably preventing the undue effects on the image qualities mentioned earlier.

Figure 10:
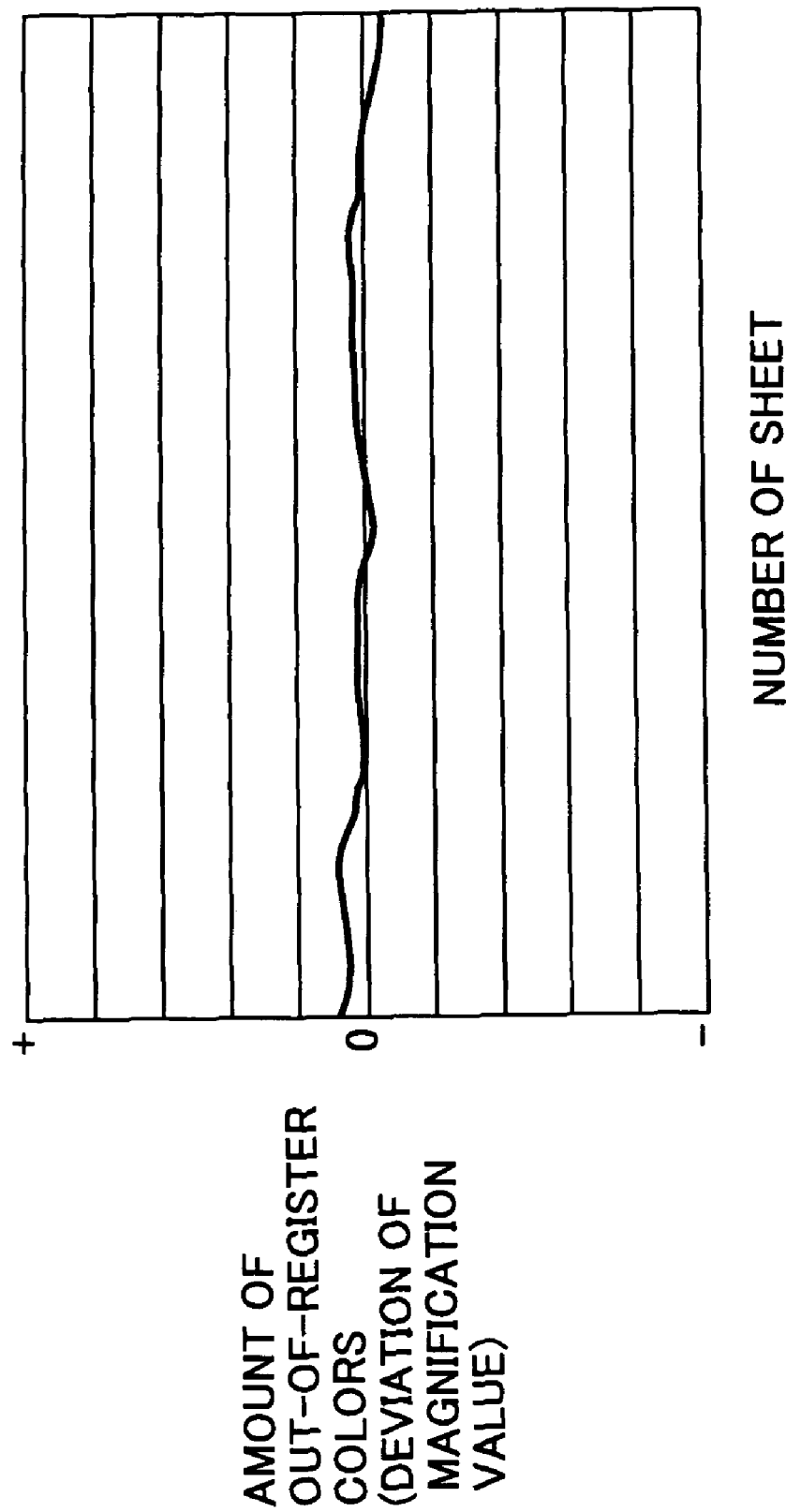
FIG. 10 is a graphical plot illustrating the change in the deviation of magnification with the increase of printed pages obtained according to the first embodiment of the invention.

The change in the deviation of magnification value (i.e., amount of out-of-register colors) with the increase in the number of printed pages is experimentally obtained according to the present embodiment and the results thereof are shown in FIG. 10.

In comparison with the results obtained by a previous method of FIG. 18, it is clearly shown that the present results retain desirable conditions through the period of the continuous printing operation, which offers advantages over the previous method.

Figure 11:
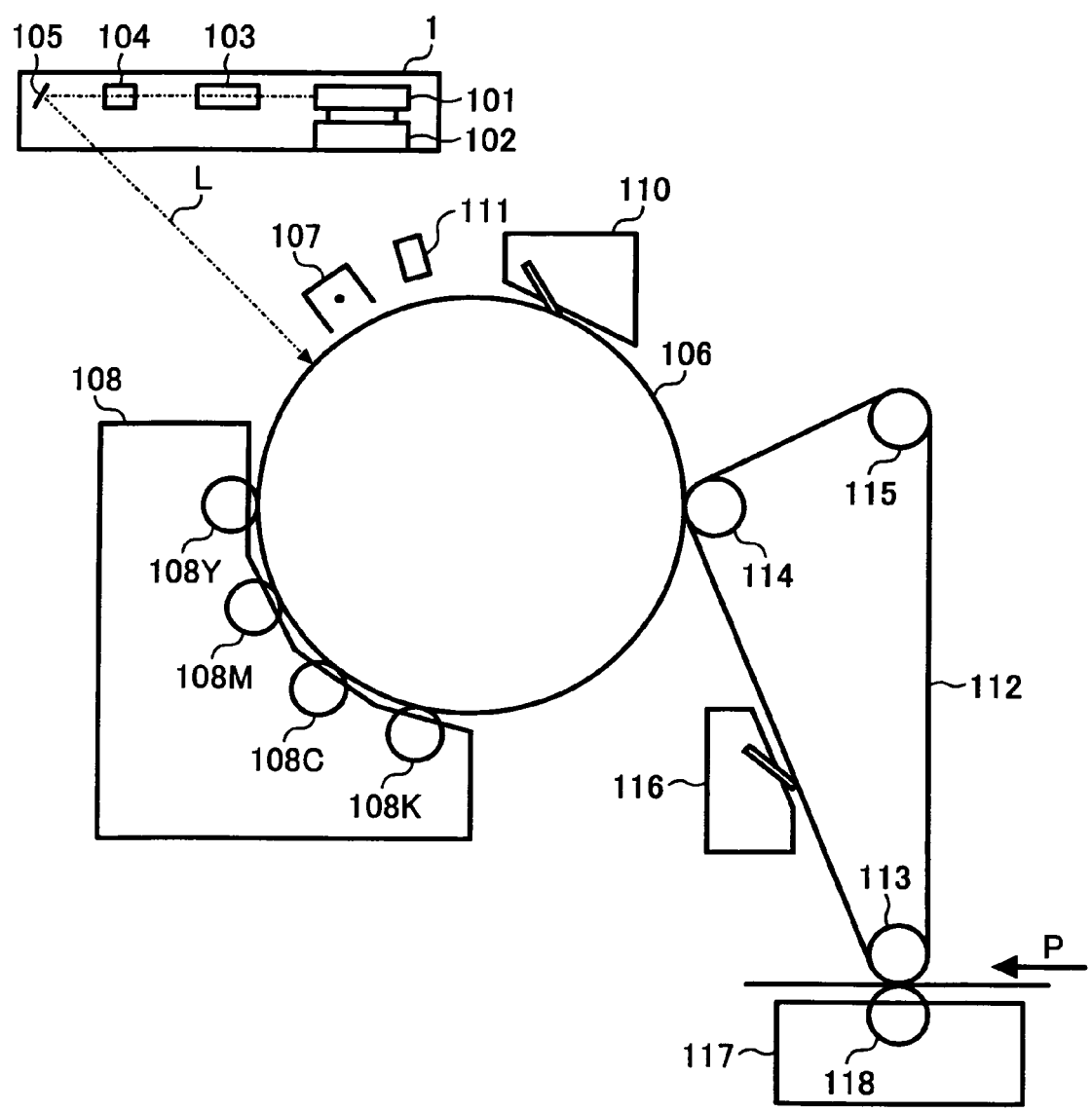
FIG. 11 is a drawing diagrammatically illustrating major components included in a full-color image forming apparatus according to a second embodiment of the invention.

FIG. 11 is a drawing diagrammatically illustrating major components included in a full-color image forming apparatus according to a second embodiment of the invention.

Referring to FIG. 11, the light beam scanning system and image forming control sections included in the full-color image forming apparatus have a similar construction to the image forming apparatus according to the first embodiment, and these unit and sections are configured to perform optical writing operations corresponding to image data, and form electrostatic latent images on a photoreceptor drum 106 serving as a latent image bearing member.

The photoreceptor drum 106 is adapted to rotate counter-clockwise in the drawing.

On the periphery of the photoreceptor drum 106, there are provided a photoreceptor cleaning unit 110, a dis-electrification unit 111, a charging unit 107, a developer unit (including a Y developer unit, M developer unit, C developer unit, and BK developer unit) 108, and an intermediate transfer belt 112 serving as another image bearing member.

The developer unit 108 includes at least developer sleeves 108Y, 108C, 108M, and 108BK, which are each provided facing the photoreceptor drum 106, and configured to dispose while rotatory stirring developing agents in respective colors, Y(yellow), C(cyan), M(magenta), and BK(black), in use for developing the latent images and developer paddles (not shown) configured to rotate so as to rake up while stirring the developing agents.

The intermediate transfer belt 112 is provided looping over a driving roller 113, a belt transfer biasing roller 114, and a slave roller 115, and is driven by a driving motor (not shown).

A belt cleaning unit 116 includes at least a blade, and a contact/detach mechanism, and is adapted to clean the intermediate transfer belt 112. In addition, this cleaning unit 116 is arranged so as not to come in contact with the intermediate transfer belt 112 by the contact/detach mechanism during the image transfer of Y, C, M, and BK toner images.

A sheet transfer unit 117 includes at least a sheet transfer biasing roller 118 and another contact/detach mechanism (not shown).

Although the sheet transfer biasing roller 118 is normally arranged to be detached from the face of the intermediate transfer belt 112, the roller 118 is brought into contact with the belt 112 by a pressing action by the contact/detach mechanism during the simultaneous transfer onto a sheet of a four-color (Y, C, M, BK) image, which is formed on the transfer belt 112 by superposing the images in respective colors. And, this transfer onto a recording sheet P is achieved by applying a predetermined biasing voltage to the roller 118.

Incidentally, the recording sheet P is adapted to be fed forward to a predetermined location suitable for the image transfer at the timing for the leading edge of the four-color image on the transfer belt 112 to reach the predetermined location.

Process steps of forming full-color images will be described herein below according to the second embodiment disclosed herein. Although the following image forming steps are described in the order of BK, C, M, and Y, they are not necessarily limited to that order, but other sequences may alternatively be adapted.

When an image forming (printing) operation starts, an optical writing (hence latent image formation) is initiated by a light beam scanning system 1 based on BK image data.

The developer sleeve 108BK starts its rotation, prior to the arrival by the leading edge of a latent image at the developing location in the BK developer unit 108, to enable an image development from the leading portion of the BK latent image, whereby the development of the BK latent image is performed using BK toner.

This developing operation then continues on the BK latent image until the end edge of BK latent image passes through the BK developing location in the BK developer unit 108 when the image development is disabled.

In addition, the BK developing operation is completed at least prior to the arrival by the leading edge of the next C latent image at the developing location in the C developer unit 108.

The intermediate transfer belt 112 is adapted to rotate at the same linear speed as the photoreceptor drum 106, and the BK toner image formed on the photoreceptor drum 106 is transferred to the surface of the transfer belt 112.

The belt transfer is carried out under a bias potential applied to a biasing roller 114 with a predetermined magnitude while the intermediate transfer belt 112 is in contact with the photoreceptor drum 106.

The intermediate transfer belt 112 is adapted to receive additional C, M, and Y toner images, which are successively transferred onto the same surface of the transfer belt 112, to form a full-color image after proper color registration. The full-color image is subsequently transferred simultaneously onto a recording sheet P.

The process proceeds with the photoreceptor drum 106 from the BK process to C process and on to M and Y. Since the C, M, and Y processes are each performed in a manner to the above-mentioned BK process, the details thereof are herewith abbreviated.

The full-color image is thus formed as above and subsequently subjected to a simultaneous transfer onto a recording sheet P. Thereafter, the full-color image is fixed onto the sheet P by a fixing unit (not shown).

The method of magnification correction described earlier in the first embodiment may also be applied in the present second embodiment as well.

In the application to the present case of a full color image, the measurement and correction steps are carried out not only between pages (e.g., between one Y image writing and the next BK image writing), but also between the lines in the same color.

In this case, it is appropriate for the period for the measurement and correction to be suitably changed depending on the details of the condition for the method.

It may be added that other sections and units included in the full-color image forming apparatus have a similar construction and capability to those descried in the first embodiment although the description thereon is not given herein.

Figure 12:
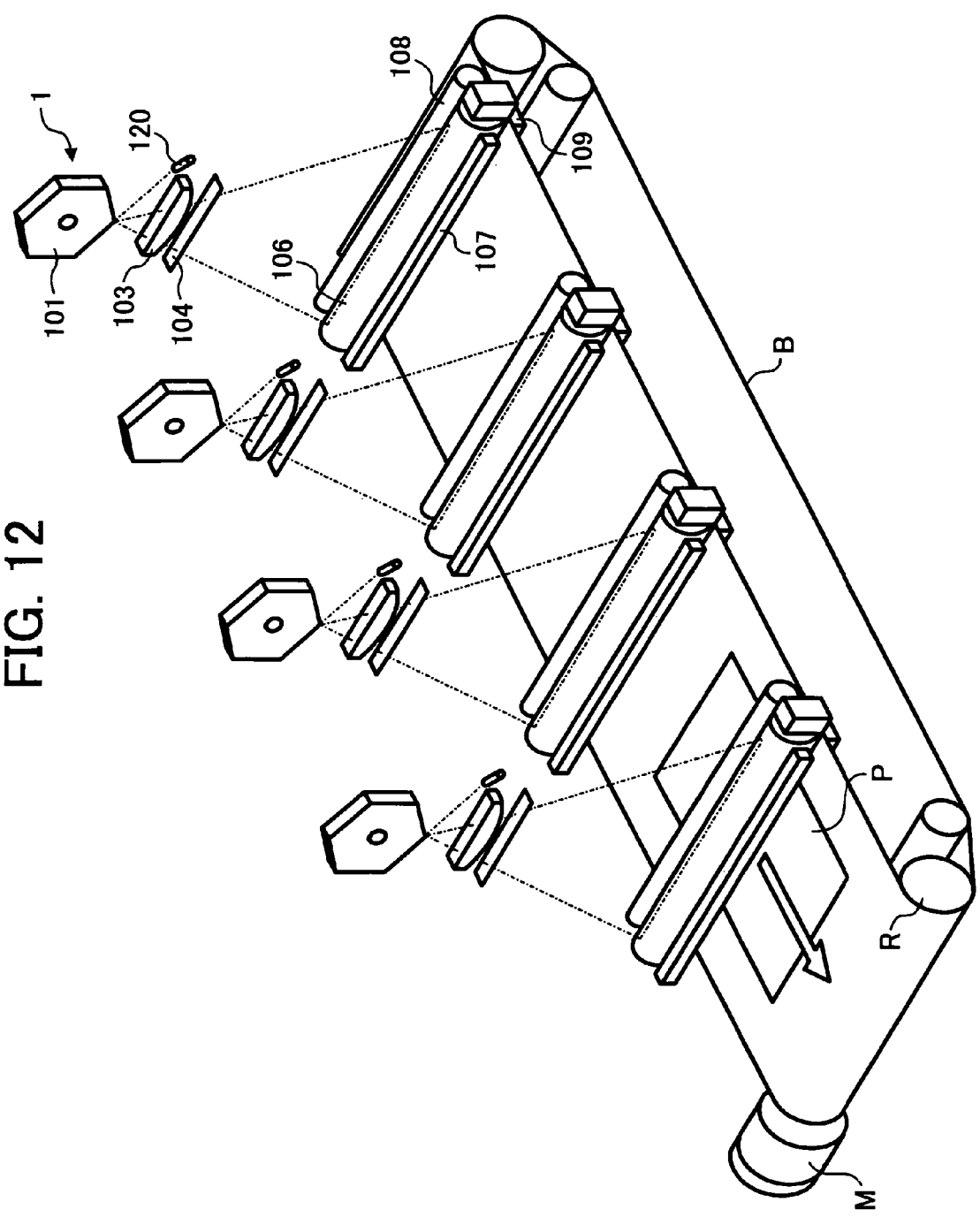
FIG. 12 is a schematic perspective view illustrating a construction of an image forming apparatus employing a four-drum system according to a third embodiment of the invention.

FIG. 12 is a schematic perspective view illustrating a construction of an image forming apparatus employing a four-drum system of a third embodiment according to the present invention.

To form a full-color image by superposing monochrome images of four colors, yellow (Y), magenta (M), cyan (C), and black (BK), the image forming apparatus of the present embodiment is provided with four image forming units (each including photoreceptor 106, developer unit 108, charging unit 107, transfer unit 109, and a cleaning unit (e.g., 110, not shown in FIG. 12) and four light beam scanning systems (optical units) 1.

The image forming apparatus, therefore, has the construction of four image forming apparatuses of FIG. 1 arranged in series.

In the image forming apparatus, an image in a first color is first formed onto a recording sheet P conveyed by a transfer belt B in the direction of the arrow, then second, third, and fourth images in that order are formed and then transferred, whereby a full-color is formed on the sheet P by superposition through color registration. Thereafter, the full-color image is permanently fixed onto the sheet P by a fixing unit (not shown).

Incidentally, the transfer belt B is provided looping over rollers R (FIG. 12), and is driven by a conveyor roller M.

In addition, four optical units of FIG. 2 are provided to serve as the optical unit. Since the four optical units each have a similar construction and capability to those described in the first embodiment, the details thereof are herewith abbreviated.

The method of magnification correction described earlier in the first embodiment may be applied in the present third embodiment as well.

In this case, it is necessary for the magnification correction to be made on each color, since the optical units are each provided independently for respective colors.

It is added that other sections and units included in the full-color image forming apparatus have a similar construction and capability to those described in the first and second embodiments although the description thereon is not repeated herein.

Figure 13:
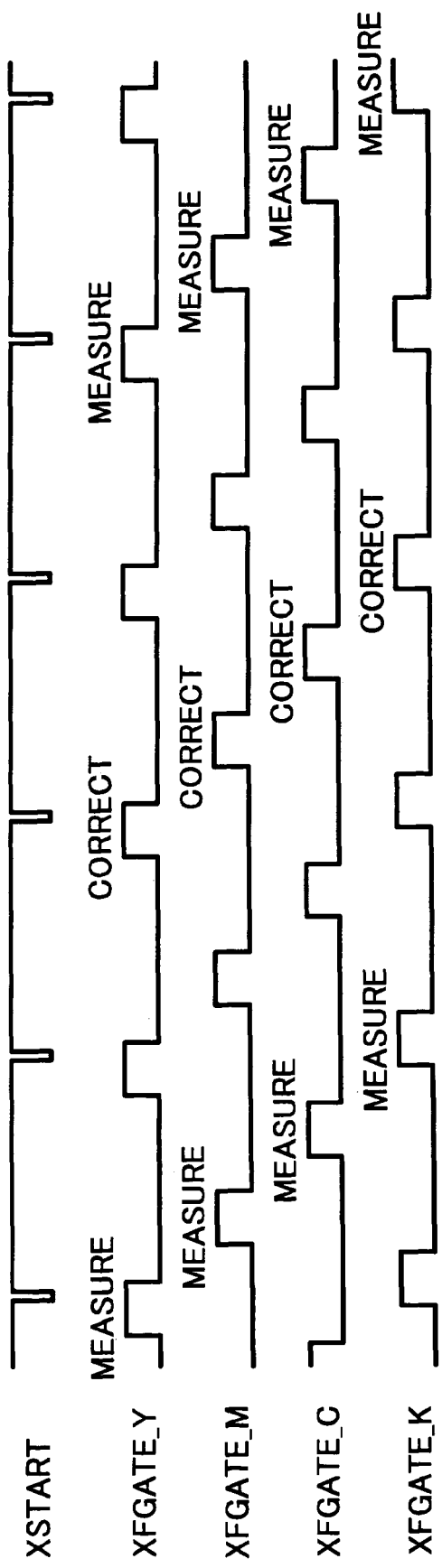
FIG. 13 is a timing diagram illustrating the timing of making magnification corrections according to the third embodiment of the invention.

FIG. 13 is a timing diagram illustrating the timing of making magnification corrections according to the third embodiment of the invention.

Referring to FIG. 13, a signal XSTART is output by pages for starting a print operation. The signals XFGATE (_Y, _M, _C, _K) are subsequently generated, based on the signal XSTART, for determining the timing of writing images and the width of respective images in the vertical scanning direction. And, the print operations start at the point where the signals XSTART turn to low (L).

The aforementioned two-point measurements for respective colors are first carried out successively between pages ("H" period of the signal XSTART) during a predetermined period. And, after completing the measurement for the lattermost color (i.e., BK color in the present case), magnification corrections between pages are made starting from the next front color (Y) and on for respective colors, successively. These steps of the two-point measurements and magnification corrections are appropriately repeated.

It may be added that it is natural that the timing for outputting the XFGATE (_Y, _M, _C, _K) signals change depending on the size of recording sheets.

The process for the magnification correction in the present embodiment is implemented in a manner similar to that in the first embodiment described earlier with reference to FIG. 7.

Namely, the process for the magnification correction begins in step S101 in which, prior to the image forming operation, the polygon motors for respective color units are driven to rotate and LD units 120 are turned on. Thereafter, two-point measurements are initiated (step S102). During these steps the setting of the pixel clock is performed based on correction values presently stored in the printer control section 201.

Subsequently, the observed time differences for respective colors are compared with the predetermined standard time differences, and an inquiry is made regarding whether any magnification correction is necessary (step S103). The decision on this inquiry is made based on correction resolution (correction precision) in the magnification. If an error of at least one half of the correction resolution is detected, it is determined that a proper correction is necessary and the process proceeds to step S104.

Correction data, 1 and 2, in this case, are then computed to be set subsequently into the pixel clock generating section (step S104) and image forming (image writing) operations are initiated (step S105).

By contrast, if no error is detected (indicating that no correction is necessary), the process proceeds to step S105 without changing any setting of the correction data into the pixel clock generating section and an image forming operation is initiated (step S105).

If any further page is not detected, the LD unit is turned off, the polygon motor is brought to a stop, and the process ends (steps S106 and S112).

Incidentally, when the decision on whether a further page(s) is present is not feasible, a two-point measurement for the front color (Y) may be initiated as a temporary measure. In this case, however, the LD unit may turn off and the polygon motor may stop even during the measurement, and the measurement is invalidated, as a result.

In the case when a further page(s) is found present, a two-point measurement for the Y front color is initiated and further measurements are also initiated for other colors, successively (step S107). The result obtained the measurement is stored and another two-point measurement is initiated (step S108).

Image forming operations are also carried out successively for respective colors. During the period of two-point measurement for one color, therefore, the operation which is carried out for other colors is image forming.

Furthermore, when the measurement for the lattermost color (BK) is completed and no further page(s) is found, the LD units are turned off, the polygon motors are brought to stop, and the processes ends (steps S109 and S112).

In the case when a further page(s) is found, by contrast, it is determined whether any magnification correction is necessary based on the result presently obtained from the measurements (step S110).

If it is decided that a proper correction is necessary, the correction data 2, in the present case, are computed (step S111) to be subsequently set into the pixel clock generating section between the pages in the first front color after completing the measurement for the lattermost color. The further data for other colors are also set, successively.

Image forming operations are carried out successively for respective colors. During the period of the correction for one color, therefore, the operation which is carried out for other colors is image forming.

In the case when it is decided that no correction is necessary, an image forming operation is initiated without changing the setting of the correction data.

Through the period of image formation, the steps of two-point measurement and correction utilizing the correction data 2 are repeated for necessary pages.

Although the correction process in the present embodiment has been illustrated herein with regard to the correction data 2, this is due to the fact that phase shift processes can be carried out with a higher speed than PLL circuit. Therefore, the process may alternatively be carried out by using suitable data other than the correction data 2 as long as the correction between plural pages is feasible by the PLL circuit.

In addition, although both the computation and setting of the correction data have been described within one single page, the computation of the data may alternatively be carried out simultaneously with the two-point measurement.

It may be added, in the case when the two-point measurement has not been completed for any color, the correction naturally cannot be carried out, and that another two-point measurement may be attempted again.

Moreover, although the measurement for the first front color is initiated after completing the correction one for the lattermost color in the above illustration with reference to FIG. 13, the measurement may alternatively be initiated during the correction period for the other color.

When the change in the deviation of the amount of out-of-register colors with the increase in the number of printed pages is experimentally obtained, the characteristics of the change in the present embodiment are found to be similar to those illustrated in FIG. 10, which are obtained earlier in the first embodiment. That is, it is clearly shown in comparison with the results obtained by the previous method of FIG. 18, that the present results also obtain desirable conditions through the period of the continuous printing operation, which offers advantages over the previous method.

Still in addition, although the tandem image forming apparatus is illustrated in FIG. 12 to be direct-transfer type, it is needless to add that the tandem apparatus of the indirect-transfer type may alternatively be employed in the present invention.

Figure 14:
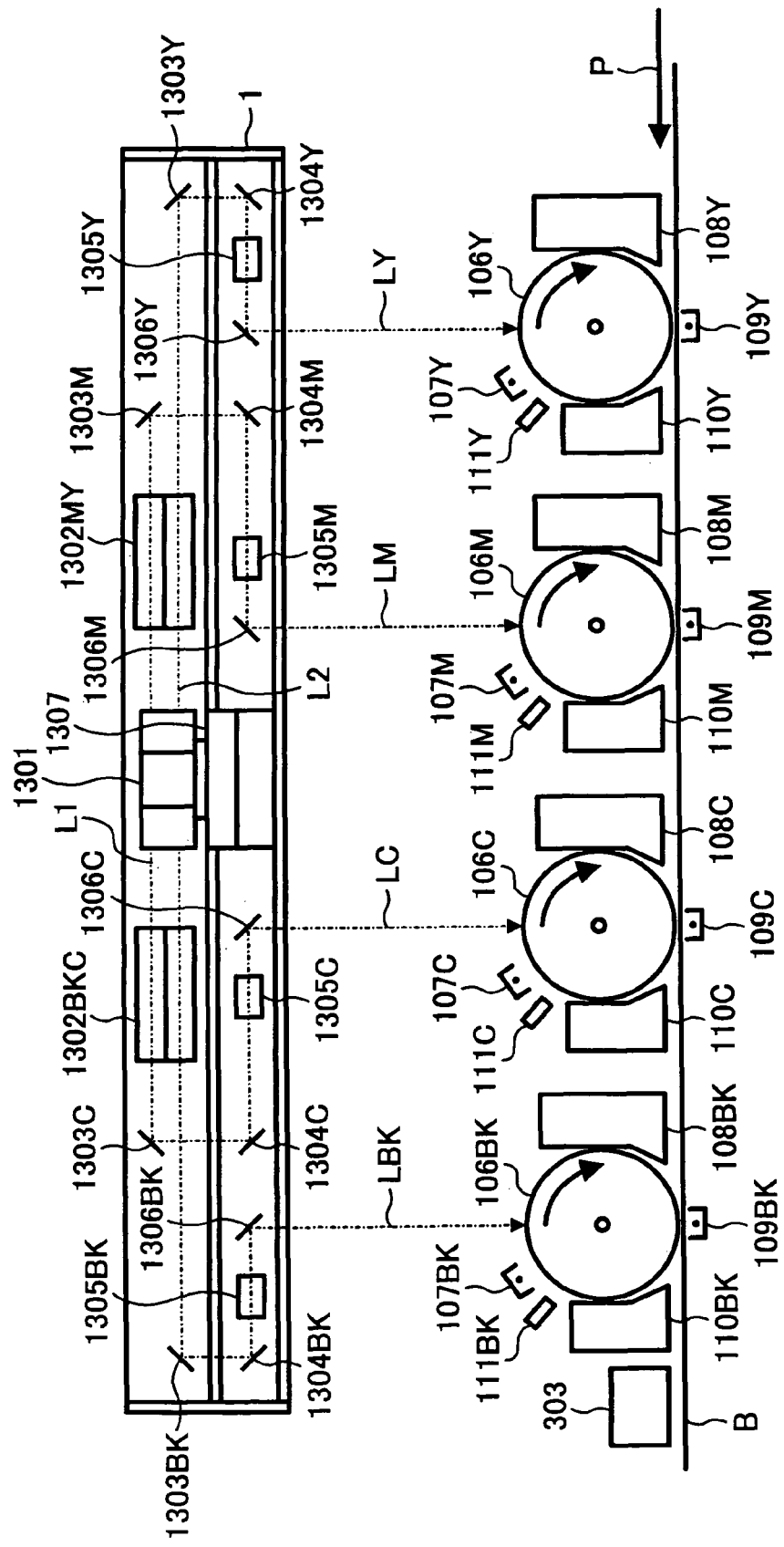
FIG. 14 is a drawing diagrammatically illustrating major portions included in an forming apparatus employing a further four-drum system according to a fourth embodiment of the invention.

FIG. 14 is a drawing diagrammatically illustrating major portions included in an forming apparatus employing a four-drum (quadruple tandem-type) system according to a fourth embodiment of the invention.

Referring to FIG. 14, to form full-color images by superposing color images in four colors (yellow, magenta, cyan, and black), the image forming apparatus is provided with several units such as four sets of image forming sections, and a light beam scanning system.

There are provided on the periphery of photoreceptor for each color, a charging unit, a developer unit, a transfer unit, a cleaning unit, and a static eliminator, which are configured to cooperatively form an image on a recording sheet by performing conventional electro-photo graphic processes, such as for charging, exposing, developing, and transfer.

With the above noted units and processes, the image forming apparatus is adapted to form an image in a first color formed onto a recording sheet conveyed in the direction of the arrow, then second, third, and fourth images in that order are formed and then transferred, whereby a full-color is formed by superposition through color registration. Thereafter, the full-color image is permanently fixed onto the sheet by a fixing unit (not shown).

In respect to the units on the periphery of photoreceptor, the capabilities and operations are similar to those described earlier in the first embodiment, and the details thereof are herein abbreviated. The light beam scanning system, however, is different from those of the previous embodiments.

The light beam scanning system 1 in the present embodiment is adapted to deflect light beams in respective colors with one single polygonal mirror 1301 utilizing separately the upper and lower portions of the surface of polygon (e.g., the upper portion for deflecting a first laser beam L1 and the lower portion for a second laser beam L2 corresponding to a color different from the beam L1).

In addition, the two beams are each directed to directions approximately opposite to each other while scanning with the polygonal mirror 1301 rotatory driven by a polygon motor 1307.

With the construction, the scanning of four laser beams corresponding to respective colors becomes feasible over the surface areas of respective photoreceptors, 106BK, 106C, 106M, and 106Y, in which the correspondence of the units to the color is hereinafter denoted by BK, C, M, Y for the colors of black, cyan, magenta, and yellow, respectively, in an abridged manner.

The laser beams corresponding to respective colors are thus deflected by the polygonal mirror 1301, transmitted through f-θ lenses 1302BKC and 1302MY, turned back by first mirrors 1303BK, C, M, Y and second mirrors 1304BK, C, M, Y, transmitted through BTLs 1305BK, C, M, Y, turned by third mirrors 1306BK, C, M, Y, and subsequently brought to scan over the surfaces of photoreceptors 106BK, C, M, Y.

In addition, there provided on the periphery of photoreceptors 106BK, C, M, Y are charging units 107BK, C, M, Y, developer units 108BK, C, M, Y, transfer units 109BK, C, M, Y, cleaning units 110BK, C, M, Y, and static eliminators 111BK, C, M, Y, corresponding to respective colors.

Figure 15:
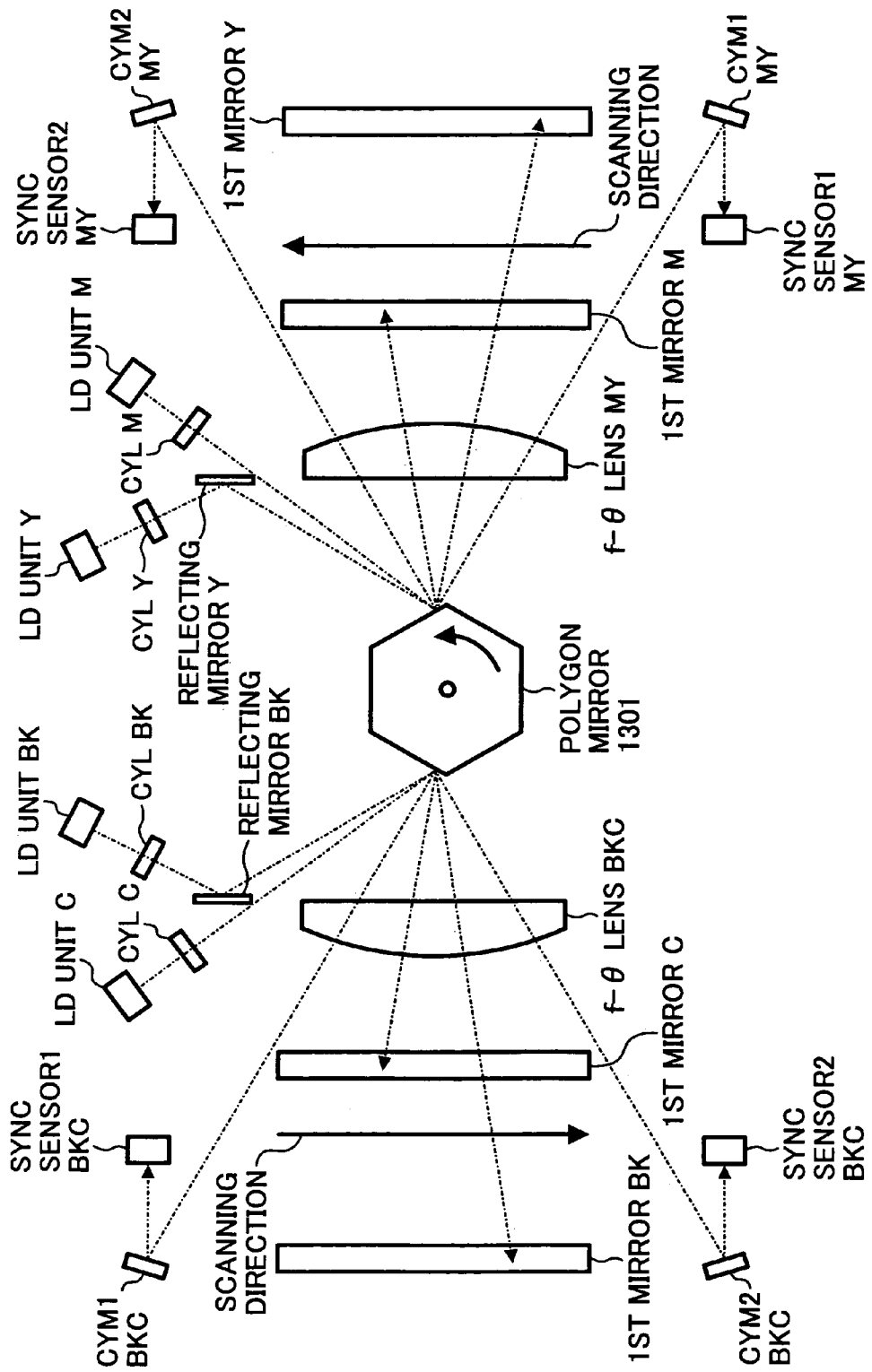
FIG. 15 is a top view of the light beam scanning system unit of FIG. 14.

FIG. 15 is a top view of the light beam scanning system unit of FIG. 14.

Incidentally, the parts numbers previously shown in FIG. 14 are abbreviated herein in FIG. 15 for purposes of clarity except 1301 for the polygon mirror.

Laser beams emanated from LD units Y and BK are transmitted through CYLs (cylindrical lenses), brought to be incident onto the lower reflective plane portion of the polygonal mirror 1301 by way of reflecting mirrors, deflected by the rotating polygonal mirror, transmitted through f-θ lenses, and turned by first mirrors.

Also, laser beams emanated from LD units M and C are transmitted through the CYLs, brought to be incident onto the upper reflective portion of the polygonal mirror 1301 by way of reflecting mirrors, deflected by the rotating polygonal mirror, transmitted through f-θ lenses, and turned by first mirrors. Further provided at the both ends of writing region in the horizontal scanning direction in the present embodiment are cylindrical mirrors (which are hereinafter referred to as CYMs), CYM1 BKC, CYM1 MY, CYM2 BKC, and CYM2 MY; and sync sensors, such as sync sensor1 BKC, sync sensor1 MY, sync sensor2 BKC, and sync sensor2 MY.

By thus provided cylindrical mirrors, CYM1 BKC, CYM1 MY, CYM2 BKC, and CYM2 MY, the beams transmitted through the f-θ lenses are reflected and converged by CYM1 BKC, CYM1 MY, CYM2 BKC, and CYM2 MY, to be incident onto sync sensor1 BKC, sync sensor1 MY, sync sensor2 BKC, and sync sensor2 MY, respectively.

The sync sensor1 BKC and sync sensor1 MY serve as sync detecting sensors for detecting the start side sync detection signal XDETP, while the sync sensor2 BKC and sync sensor2 MY serve as sync detecting sensors for detecting the end side sync detection signal XEDETP.

In addition, the beams from LD unit C and from BK are designed to utilize in common CYM1 BKC, CYM2 BKC, sync sensor1 BKC, and sync sensor2 BKC; while the beams from LD unit M and from Y are designed to utilize in common CYM1 MY, CYM2 MY, sync sensor1 MY, and sync sensor2 MY.

Since two kinds of laser beams are thus incident onto one single sensor, the timing of the incidence is devised to differ from one another so that the beams can be detected individually.

It may be noted that two sensors may alternatively be provided to carry out the detection for each beam independently. In addition, the laser beams CBK are scanned in the direction opposite to that of the beams MY as shown in FIG. 15.

In a case when two kinds of laser beams are incident onto one single sensor, it is necessary for the image forming control sections of FIG. 2 to be additionally provided with a signal separation unit for separating the detected start side sync detection signals XDETP into constituent sync detection signals corresponding to each beam.

The signal separation unit (not shown) is therefore provided with the capability of sending thus separated sync detection signals to the image forming control sections corresponding to respective colors, such as the phase sync clock generating section, sync detection lighting control section, and magnification error detection section.

In addition, in the case when one sync detecting sensor is provided for each color, the image forming control sections connected to the sensor assume the same structure as FIG. 2 for respective colors.

In regard to the beam scanning in the present embodiment, the direction of beam scanning for YM color, for example, is opposite with respect to BK.

Therefore, if any change in magnification takes place for the YM beam, this may show up as a positional deviation of the image of the corresponding magnitude in the horizontal scanning direction. By contrast, in the case where a similar change takes place for the C beam, this does not cause the positional deviation of the image.

As a result, the precision of magnification correction may have an influence directly on that of positional correction in the horizontal scanning direction.

The method of magnification correction described earlier in the third embodiment may also be applied in the present fourth embodiment as well.

In the case when the two-point measurement cannot be completed for any color in the third embodiment, no correction is carried out on respective colors.

In the present embodiment, by contrast, no correction is made on the color with the same scanning direction only when the two-point measurement on the color with the same scanning direction is not completed. And, on the color with the opposite scanning direction, the correction is made based on the result obtained from the two-point measurement.

It may be added that other sections and units included in the full-color image forming apparatus have similar constructions and capabilities to those described earlier in the first and third embodiments although the description thereon is not given herein.

Figure 16:
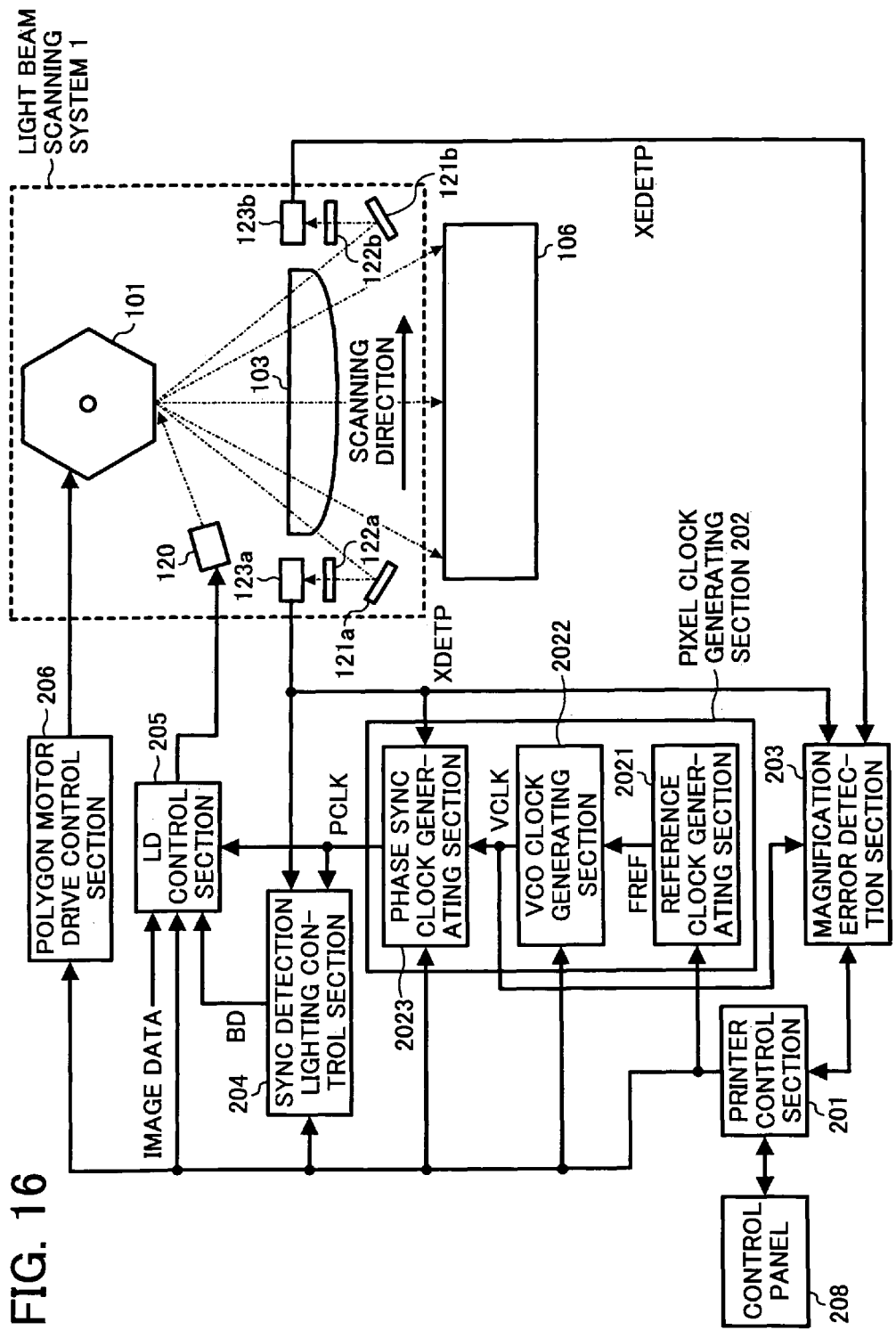
FIG. 16 is a drawing diagrammatically illustrating the light beam scanning system and image forming control sections according to a fifth embodiment of the invention.
Figure 17:
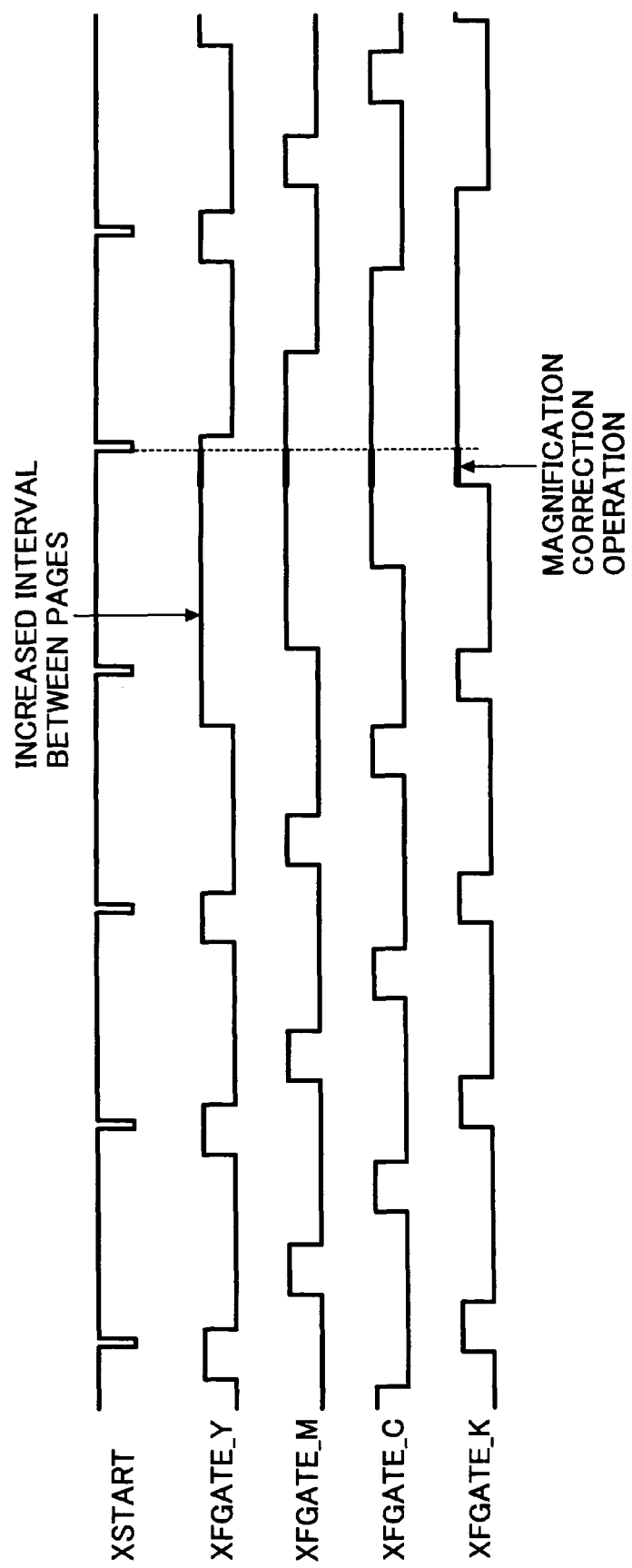
FIG. 17 is a timing diagram illustrating the timing of output signals for making magnification corrections between pages in a previous image forming apparatus configured to form a full color image by superposing four monochromatic images.

FIG. 16 is a drawing diagrammatically illustrating a beam scanning system and image forming control sections included in an image forming apparatus according to a fifth embodiment of the invention.

Referring to FIG. 16, the present structure of the beam scanning system and image forming control sections is similar to those described earlier in the first embodiment with reference to FIG. 2 additionally provided with an external input unit 208.

In the present embodiment, a control panel 208 serves as the external input unit which is capable of setting up the frequency of implementing magnification correction.

The correcting unit is therefore able to detect and correct the error at intervals of a predetermined period (or frequency). With decreasing the frequency, LD lighting-up hours decrease and its life is increased, accordingly.

It may be added that other sections and units included in the image forming apparatus have similar constructions and capabilities to those described earlier in the first through fourth embodiments, although the description thereon is not given herein.

It is apparent from the above description including the examples disclosed, that the image forming apparatuses and methods disclosed herein have several advantages over similar apparatuses and methods previously known.

In the image forming apparatus of the invention, the capabilities of correcting image magnification error are achieved by detecting a light beam deflected by a polygon mirror at least at two separate locations on the line in the horizontal scanning direction, measuring the difference in time of passage between these locations, making a comparison between the thus determined interval and a reference interval, and generating a proper amount of correction corresponding to the determined interval, such as either first correction data adapted to change the frequency of a pixel clock, or second correction data to change the period of the pixel clock by pixels.

The magnification correction and two-point measurement of the invention are performed alternately during a predetermined period such as, for example, an in-between period of the pages.

The magnification correction is carried out with a light source, included in the light beam scanning system of the image forming apparatus, configured to be lighting controlled according to image data, and a pixel clock for use in lighting control of the light source is variably controlled so as to correct the error by properly controlling at least one of the frequency and cycle of pixel clock.

In the present invention, the cycle of the pixel clock is variably controlled by pixels, and the variable control by pixels is implemented at more than one location in the horizontal scanning direction.

According to the aforementioned construction together with the methods disclosed, the capabilities of correcting an image magnification error are achieved without prolonging either the non-writing periods or interval between the pages, and without unduly affecting print speeds. As a result, the occurrence of a shear in color printing can be alleviated even when errors of image magnification arise in the image forming apparatus.

While the invention has been described in connection with the preferred embodiment, it will be understood that it is not intended to limit the invention to the embodiment. On the contrary, it is intended to cover such modifications or variations as may come within the scope of the following claims.

What is claimed is:

1. An image forming apparatus, comprising:
   an image forming unit;
   a detection unit configured to detect an error of image magnification in a horizontal scanning direction during a first non-writing period, the non-writing period being defined by a period of time from a finish of a current image writing to a start of a next image writing in the horizontal scanning direction; and
   a correcting unit configured to:
   instruct said detection unit to detect said error during said first non-writing period, and
   correct said error during a second non-writing period based on a result of said error obtained by said detection unit in said first non-writing period, said second non-writing period being different from said first non-writing period.

2. The image forming apparatus according to claim 1, wherein said image forming unit comprises:
- a light beam scanning system, including:
  - first and second light beam sensing units configured to detect a light beam deflected by a beam deflection unit in the horizontal scanning direction, and
  - a time measurement unit configured to measure a time difference in light beam detection between said first and second light beam sensing units;
- wherein said correcting unit is further configured to compute said error based on a result of the time difference measured by said time measurement unit.

3. The image forming apparatus according to claim 2, wherein said light beam scanning system further comprises:
- a light source configured to be lighting controlled according to image data, and
- at least one of:
  - a frequency control unit configured to variably control a frequency of a pixel clock for use in lighting control of said light source, or
  - a cycle control unit configured to variably control a cycle of the pixel clock, so as to correct said error by variably controlling at least one of the frequency and cycle.

4. The image forming apparatus according to claim 3, wherein said image forming unit is configured to perform an image formation by:
- forming a latent image on an image bearing member by irradiating a light beam according to image data, said image bearing member being one of rotating or moving;
- developing the latent image into a visible image by a developer unit; and
- transferring the visible image to a recording medium, said recording medium being conveyed by a transfer unit, said transfer unit being one of rotating or moving.

5. The image forming apparatus according to claim 3, wherein said image forming unit is configured to perform an image formation by:
- forming a latent image on an image bearing member by irradiating a light beam according to image data, said image bearing member being one of rotating or moving;
- developing the latent image into a visible image with a developer unit;
- transferring the visible image to a transfer unit, said transfer unit being one of rotating or moving; and
- transferring the visible image further to a recording medium.

6. The image forming apparatus according to claim 3, wherein the cycle of said pixel clock is variably controlled to be varied for only one clock pulse per a correction data.

7. The image forming apparatus according to claim 6, wherein the variable control is implemented at more than one location in the horizontal scanning direction.

8. The image forming apparatus according to claim 4, wherein said correcting unit is further configured to detect and correct said error at intervals of a predetermined period after finishing a printing operation.

9. The image forming apparatus according to claim 8, further comprising:
- an external input unit configured to set externally the predetermined period.

10. The image forming apparatus according to claim 2, wherein said image forming unit is configured to perform an image formation by:
- forming a latent image on an image bearing member by irradiating a light beam according to image data, said image bearing member being one of rotating or moving;
- developing the latent image into a visible image by a developer unit; and
- transferring the visible image to a recording medium, said recording medium being conveyed by a transfer unit, said transfer unit being one of rotating or moving.

11. The image forming apparatus according to claim 2, wherein said image forming unit is configured to perform an image formation by:
- forming a latent image on an image bearing member by irradiating a light beam according to image data, said image bearing member being one of rotating or moving;
- developing the latent image into a visible image with a developer unit;
- transferring the visible image to a transfer unit, said transfer unit being one of rotating or moving; and
- transferring the visible image further to a recording medium.

12. The image forming apparatus according to claim 2, wherein said correcting unit is further configured to detect and correct said error at intervals of a predetermined period after finishing a printing operation.

13. A method for correcting an error of image magnification for an image forming apparatus, comprising:
- detecting an error of image magnification in a horizontal scanning direction during a first non-writing period, the non-writing period being defined by a period of time from a finish of image writing to a start of next image writing in the horizontal scanning direction; and
- correcting said error during a second non-writing period based on a result of said error obtained in said first non-writing period in the detecting, said second non-writing period being different from said first non-writing period.

14. The method according to claim 13, further comprising:
- correcting said error, including variably controlling at least one of a frequency or a cycle of a pixel clock for use in lighting control of a light source.

15. An image forming apparatus, comprising:
- image forming means;
- detection means for detecting an error of image magnification in a horizontal scanning direction during a first non-writing period, the non-writing period being defined by a period of time from a finish of a current image writing to a start of next image writing in the horizontal scanning direction; and
- correcting means for:
  - instructing said detection means to detect said error during said first non-writing period, and
  - correcting said error during a second non-writing period based on a result of said error obtained by said detection means in said first non-writing period, said second non-writing period being different from said first non-writing period.

16. The image forming apparatus according to claim 15, wherein said image forming means comprises light beam scanning means, including:
- first and second light beam sensing means for detecting a light beam deflected by beam deflection means in the horizontal scanning direction, and
- time measurement means for measuring a time difference in light beam detection between said first and second light beam sensing means;
- wherein said correcting means further computes said error based on a result of the time difference measured by said time measurement means.

17. The image forming apparatus according to claim 16, wherein said light beam scanning means further comprises:

light source means for being lighting controlled according to image data, and at least one of:

frequency control means for variably controlling a frequency of a pixel clock for use in lighting control of said light source means, or cycle control means for variably controlling a cycle of the pixel clock, so as to correct said error by variably controlling at least one of the frequency and cycle.

18. The image forming apparatus according to claim 17, wherein said image forming means is for performing an image formation by:

forming a latent image on an image bearing means by irradiating a light beam according to image data, said image bearing means being one of rotating or moving;

developing the latent image into a visible image by developer means; and transferring the visible image to recording medium means, said recording medium means being conveyed by transfer means, said transfer means being one of rotating or moving.

19. The image forming apparatus according to claim 17, wherein said image forming means is for performing an image formation by:

forming a latent image on an image bearing member by irradiating a light beam according to image data, said image bearing means being one of rotating or moving;

developing the latent image into a visible image by developer means;

transferring the visible image to transfer means, said transfer means being one of rotating or moving; and transferring the visible image further to recording medium means.

20. The image forming apparatus according to claim 17, wherein said correcting means is further for detecting and correcting said error at intervals of a predetermined period after finishing a printing operation.

21. The image forming apparatus according to claim 20, further comprising:

external input means for setting externally the predetermined period.

* * * * *